(12) United States Patent
Seo et al.

(10) Patent No.: US 12,464,313 B2
(45) Date of Patent: Nov. 4, 2025

(54) ELECTRONIC DEVICE AND OPERATION METHOD USING A GEO-FENCE

(71) Applicant: Samsung Electronics Co., Ltd., Suwon-si (KR)

(72) Inventors: Yunhwa Seo, Suwon-si (KR); Myeongwoo Koo, Suwon-si (KR); Sunggyu Lee, Suwon-si (KR); Sunggyu Yim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 283 days.

(21) Appl. No.: 18/140,654

(22) Filed: Apr. 28, 2023

(65) Prior Publication Data

US 2023/0262415 A1    Aug. 17, 2023

Related U.S. Application Data

(63) Continuation of application No. PCT/KR2022/010893, filed on Jul. 25, 2022.

(30) Foreign Application Priority Data

Jul. 30, 2021    (KR) .................. 10-2021-0100787

(51) Int. Cl.
*H04W 4/021*        (2018.01)
*H04W 64/00*        (2009.01)

(52) U.S. Cl.
CPC ........... *H04W 4/021* (2013.01); *H04W 64/00* (2013.01)

(58) Field of Classification Search
CPC ....... H04W 76/14; H04W 4/023; H04W 4/80; H04W 52/02; H04W 88/02;
(Continued)

(56) References Cited

U.S. PATENT DOCUMENTS

| 8,824,346 B2 | 9/2014 | Woo et al. |
| 9,769,686 B2 | 9/2017 | Kang et al. |

(Continued)

FOREIGN PATENT DOCUMENTS

| KR | 20140135569 A | 11/2014 |
| KR | 20150124873 A | 11/2015 |

(Continued)

OTHER PUBLICATIONS

Extended European Search Report Issued In EP Application No. 22849836.6-1218, Mail Date Aug. 9, 2024, 6 Pages.

(Continued)

*Primary Examiner* — Nimesh Patel
(74) *Attorney, Agent, or Firm* — CANTOR COLBURN LLP

(57) ABSTRACT

An electronic device according to an embodiment includes an application processor, and a wireless communication chipset, the wireless communication chipset is configured to, while the application processor is in a low power state, identify a first location of a first external device, acquire information on a second location of the electronic device via a location tracking circuit, and determine, based on the information on the second location, whether the electronic device is located within a first range with respect to the first location, the wireless communication chipset is configured to process a first signal received from the first external device based on a determination that the electronic device is located within the first range, and the application processor is configured to process the first signal received from the first external device based on a determination that the electronic device is located outside the first range.

20 Claims, 17 Drawing Sheets

(58) Field of Classification Search
CPC ......... H04W 52/0254; H04W 52/0261; H04W 84/12; H04W 88/06; H04W 4/02; H04W 4/029; H04W 64/00; H04W 48/16; H04W 4/021; H04W 8/005; H04W 84/042; H04W 36/322; H04W 76/15; H04W 36/302; H04W 76/10; H04W 36/14; H04W 4/50; H04W 52/283; H04W 64/003; H04W 36/0009; H04W 4/33; H04W 4/025; H04W 52/0209; H04W 36/0085; H04W 36/08; H04W 4/08; H04W 4/21; H04W 4/40; H04W 92/02; H04W 72/25; H04W 92/18; H04W 72/0446; H04W 72/51; H04W 36/0088; H04W 28/26; H04W 80/12; H04W 52/383; H04W 84/005; H04W 52/0235; H04W 72/121; Y02D 30/70; Y02D 10/00; Y02D 30/50; Y02D 30/00; H04M 1/72412; H04M 2250/12; H04M 2250/04; H04M 2250/02; H04M 1/72457; H04M 2242/30; H04M 1/72463; H04M 1/6066; H04M 1/73; H04M 2203/2094; H04M 2242/14; H04M 2250/06; G01S 19/34; G01S 19/48; G01S 5/0072; G01S 5/0284; G01S 5/0027; G01S 1/02; G01S 1/08; G01S 5/0009; G01S 13/46; G01S 2013/466; G01S 19/42; G01S 5/06; G01S 5/10; G01S 17/04; G01S 5/0249; G01S 5/0295; G01S 1/042; G01S 1/0428; G01S 5/0236; G01S 5/0036; G01S 2205/008; G01S 5/0063; G01S 5/021; G01S 5/0268; H04L 5/0048; H04L 27/0006; H04L 5/0051; H04L 5/0094; H04L 63/0876; H04L 12/46; H04L 12/4641; H04L 2209/80; H04L 63/0272; H04L 63/10
See application file for complete search history.

(56) References Cited

U.S. PATENT DOCUMENTS

| | | | |
|---|---|---|---|
| 10,149,095 | B2 | 12/2018 | Lee et al. |
| 10,440,168 | B2 | 10/2019 | Endo |
| 10,749,384 | B2 | 8/2020 | Park et al. |
| 11,115,929 | B2 | 9/2021 | Yeon et al. |
| 12,278,882 | B2 | 4/2025 | Lee et al. |
| 2011/0070833 | A1* | 3/2011 | Perkins ............... H04W 84/22 455/41.1 |
| 2012/0003932 | A1* | 1/2012 | Zhodzishsky ..... H04W 52/0229 455/41.2 |
| 2012/0309409 | A1 | 12/2012 | Grosman et al. |
| 2013/0093627 | A1* | 4/2013 | Cosman ................. G01S 5/01 342/451 |
| 2013/0210425 | A1 | 8/2013 | Nagaraj |
| 2014/0185599 | A1* | 7/2014 | Vatanapanpilas ..... H04W 48/20 370/338 |
| 2017/0171803 | A1 | 6/2017 | Maheswaranathan |
| 2017/0230781 | A1* | 8/2017 | Luo ..................... H04W 4/70 |
| 2017/0258401 | A1* | 9/2017 | Volpe ................. A61B 5/14542 |
| 2018/0020402 | A1* | 1/2018 | Emmanuel .......... H04W 56/001 |
| 2018/0249409 | A1 | 8/2018 | Cho et al. |
| 2020/0329362 | A1 | 10/2020 | Thota |
| 2020/0344708 | A1* | 10/2020 | Liao ..................... H04W 72/02 |
| 2021/0006652 | A1 | 1/2021 | Ledvina et al. |

FOREIGN PATENT DOCUMENTS

| | | |
|---|---|---|
| KR | 20180004560 A | 1/2018 |
| KR | 20190003194 A | 1/2019 |
| KR | 20190038438 A | 4/2019 |
| KR | 20220101856 A | 7/2022 |
| WO | 2021105683 A1 | 6/2021 |

OTHER PUBLICATIONS

International Search Report and Written Opinion for International Application No. PCT/KR2022/010893; International Filing Date Jul. 25, 2022; Date of Mailing Oct. 28, 2022; 64 Pages.

* cited by examiner

ELECTRONIC DEVICE AND OPERATION METHOD USING A GEO-FENCE

CROSS-REFERENCE TO RELATED APPLICATIONS

This application is a continuation of International Application No. PCT/KR2022/010893 designating the United States, filed on Jul. 25, 2022, in the Korean Intellectual Property Receiving Office and claiming priority to Korean Patent Application No. 10-2021-0100787, filed on Jul. 30, 2021, in the Korean Intellectual Property Office, the disclosures of which are incorporated by reference herein in their entireties.

BACKGROUND

Various embodiments disclosed in the document relate to an electronic device and an operation method using a geo-fence.

DESCRIPTION OF RELATED ART

Recently, there is increasing interest in Bluetooth technology, which is a standard for two-way short-range communication between electronic devices. The Bluetooth communication scheme is a short-range wireless communication technology that enables two-way real-time data transmission or reception by wirelessly connecting electronic devices located within a short distance. As the Bluetooth communication scheme is adopted as the standard for wireless communication, various technologies are being developed, and the range of its application is increasing due to very low power consumption.

Recently, a Bluetooth low energy communication technology, which is available with low power consumption and enables fast data transmission or reception, has been proposed. The Bluetooth low energy communication technology is being used in various fields, such as health care and medical service as well as communication between devices such as a monitoring sensor, a mobile computer, a mobile phone, a headset, a PDA, a tablet PC, and a printer.

An application processor of an electronic device may be switched to a low power state under a designated condition in order to minimize power consumption. For example, the application processor may be switched to the low power state when there is no user input for a designated period. The electronic device may maintain a short-distance communication connection to an external device via a wireless communication chipset (e.g., a Bluetooth chipset) even when the application processor is in the low power state.

When the application processor is in the low power state, the electronic device may need to periodically receive a signal from an external device in order to establish a new communication channel with the external device or maintain a connected communication channel. To this end, when the electronic device releases the application processor from the low power state or controls the wireless communication chipset to periodically receive the signal, power consumption may increase.

SUMMARY

In various embodiments disclosed in the document, it may be determined, without periodic signal reception, whether an electronic device is able to make a short-range communication connection to an external device, based on whether the electronic device is located within a geo-fence of the external device.

An electronic device according to various embodiments of disclosure includes an application processor, and a wireless communication chipset electrically connected to the application processor and configured to support short-range communication, the wireless communication chipset is configured to, while the application processor is in a low power state, identify a first location of a first external device, acquire information on a second location of the electronic device via a location tracking circuit, and determine, based on the information on the second location, whether the electronic device is located within a first range with respect to the first location, the wireless communication chipset is configured to process a first signal received from the first external device based on a determination that the electronic device is located within the first range, and the application processor is configured to process the first signal received from the first external device based on a determination that the electronic device is located outside the first range.

An operation method of an electronic device according to various embodiments of disclosure including an application processor and a wireless communication chipset according to various embodiments disclosed in the document includes, while the application processor is in a low power state, identifying a first location of an external device, acquiring information on a second location of the electronic device, determining, based on the information on the second location, whether the electronic device is located within a designated range with respect to the first location, classifying, based on the determination, the external device into a first group or a second group, processing, by the wireless communication chipset, a first signal received from the external device based on a determination that the external device is classified into the first group, and processing, by the application processor, the first signal received from the external device based on a determination that the external device is classified into the second group.

According to various embodiments disclosed in the document, an electronic device can reduce power consumption thereof by determining whether a short-distance communication connection to an external device can be maintained using a geo-fence.

In addition, various effects directly or indirectly identified via the document can be provided.

BRIEF DESCRIPTION OF THE DRAWINGS

In relation to the description of the drawings, the same or similar reference numerals may be used for the same or similar elements.

DETAILED DESCRIPTION

Hereinafter, various embodiments of the disclosure will be described with reference to the accompanying drawings. However, this is not intended to limit the disclosure to a specific form and should be understood to include various modifications, equivalents, and/or alternatives of embodiments of the disclosure.

Figure 1:
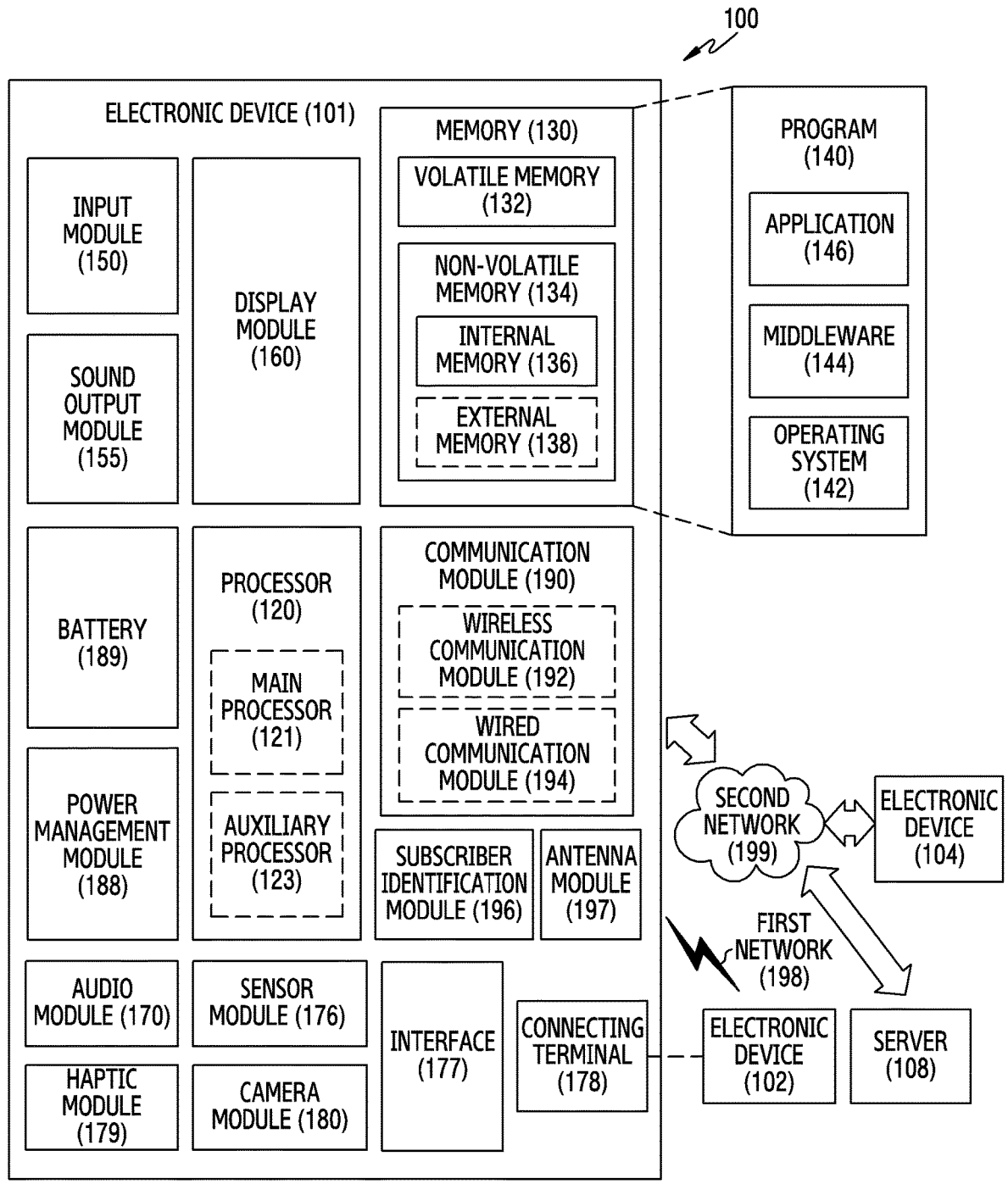
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
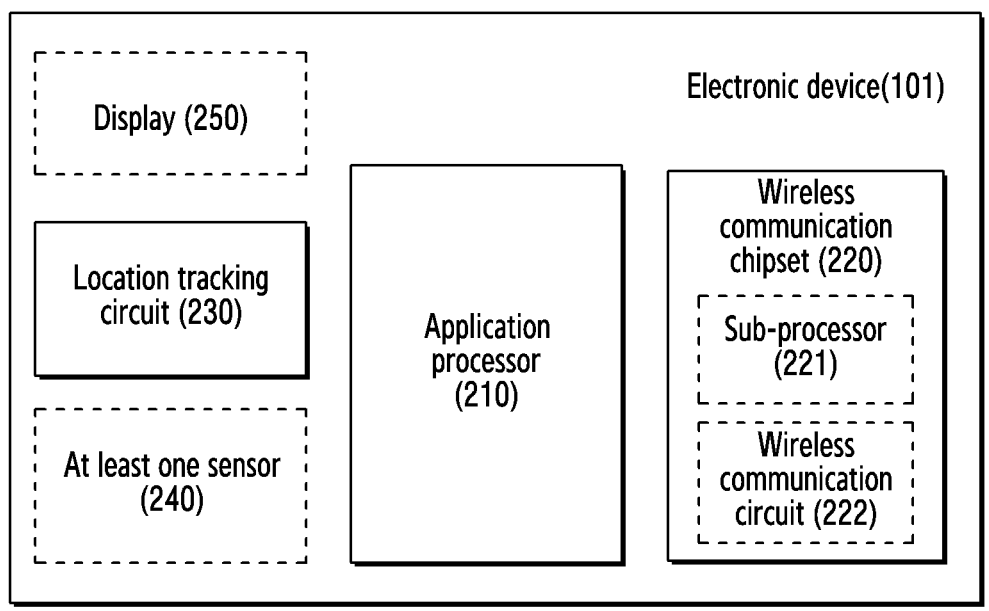
FIG. 2 is a block diagram of the electronic device according to an embodiment.

FIG. 2 is a block diagram of the electronic device according to an embodiment.

Referring to FIG. 2, the electronic device 101 according to an embodiment may include an application processor 210 (e.g., the processor 120 of the FIG. 1), a wireless communication chipset 220, a location tracking circuit 230, at least one sensor 240 (e.g., the sensor module 176 of FIG. 1), and/or a display 250 (e.g., the display module 160 of FIG. 1).

According to an embodiment, the application processor 210 may be switched to a low power state to reduce power consumption when a designated event occurs. For example, when there is no user input to the electronic device 101 for a designated period, or a user activates a low power state via a user input (e.g., a touch input) to the display 250, the application processor 210 may be switched to the low power state. In an embodiment, the application processor 210 may be released from the low power state when a designated event occurs. For example, when a call is received from an external device in the low power state or when a user input (e.g., a touch input) is received to the display 250, the application processor 210 may be released from the low power state.

According to an embodiment, the wireless communication chipset 220 may be electrically connected to the application processor 210. For example, the wireless communication chipset 220 may include a sub-processor 221 and/or a wireless communication circuit 222. In an embodiment, the wireless communication chipset 220 may establish a short-range communication (e.g., Bluetooth low energy communication) connection to at least one external device while the application processor 210 is in the low power state. For example, while the application processor 210 is in the low power state, the sub-processor 221 may control the wireless communication circuit 222 to receive a signal (e.g., an advertising signal) from a first external device, thereby establishing a communication connection. In one example, the sub-processor 221 may transmit data to and/or receive data from the first external device via the wireless communication circuit 222. In the embodiment of FIG. 2, it has been described that the sub-processor 221 performs short-range communication with an external device by using the wireless communication circuit 222 included in the wireless communication chipset 220. However, this is merely an example, and in another embodiment, the sub-processor 221 may perform short-range communication with an external device by using an additional wireless communication circuit of the electronic device 101, which is not included in the wireless communication chipset 220.

According to an embodiment, the wireless communication chipset 220 may support cellular communication (e.g., 2G communication, 3G communication, long-term evolution (LTE) communication, and new radio (NR) communication). In an embodiment, the electronic device 101 may identify a location of the electronic device 101 or a location of an external device by using the wireless communication chipset 220. For example, the wireless communication chipset 220 may support a cellular positioning system (CPS) and/or a Wi-Fi positioning system (WPS), based on cellular communication. In an example, the electronic device 101 may identify a location of the electronic device 101 or a location of an external device by using a CPS and/or a WPS supported by the wireless communication chipset 220.

Operations performed by the wireless communication chipset 220 disclosed in the document may be understood to be performed substantially by the sub-processor 221 of the wireless communication chipset 220.

According to an embodiment, the location tracking circuit 230 may be electrically connected to the application processor 210 and the wireless communication chipset 220. In an embodiment, the location tracking circuit 230 may include, for example, a global navigation satellite system (GNSS) circuit. In an embodiment, the GNSS circuit may support a satellite navigation system based on navigation Indian constellation (NAVIC), a global positioning system (GPS), a global navigation satellite system (GLONASS), Galileo, Beidou, and a quasi-zenith satellite system (QZSS). In an embodiment, the wireless communication chipset 220 may identify a location of an external device by using the location tracking circuit 230.

There may be various methods of identifying a location of an external device by the wireless communication chipset 220, other than identifying a latitude/longitude position of the external device via the location tracking circuit 230. For example, the wireless communication chipset 220 may identify a location of an external device, based on a round trip time (RTT) and an angle of arrival (AOA) of an RF signal received from the external device via a UWB antenna (e.g., the antenna module 197 of FIG. 1) of the electronic device 101. For example, the wireless communication chipset 220 may transmit a distance measurement request message to the external device via the UWB antenna, and then identify a time (RTT) required to receive, from the external device, a response message to the distance measurement request, and may identify a time of flight (TOF), which is a time required for a radio wave transmitted from the electronic device 101 to reach the external device, based on the RTT. Via the TOF, the electronic device 101 may identify a relative distance between the electronic device 101 and the external device. The electronic device 101 may include at least three UWB antennas, and the electronic device 101 may identify an angle of arrival (AOA) of a radio frequency (RF) signal received from the external device, based on a phase difference of RF signals received by the UWB antennas from the external device and a physical distance at which the UWB antennas are spaced apart, and may identify a direction in which the external device is located, based on the angle of arrival (AOA). As a result, the electronic device 101 may identify the location of the external device, based on the identified TOF and AOA.

As another example, when a communication connection is established between the external device and the electronic device 101, but the connection is released, the relative distance may be estimated based on information on the location of the external device, which is received from the external device while the communication connection is established.

According to an embodiment, the at least one sensor 240 may be electrically connected to the application processor 210. The at least one sensor 240 may include, for example, a gyro sensor, an acceleration sensor, a geomagnetic sensor, and/or a barometric pressure sensor. The geomagnetic sensor may be used to determine a direction, and the barometric pressure sensor may be used to measure an altitude of the electronic device 101. In an embodiment, the application processor 210 may identify movement of the electronic device 101 via at least one sensor 240. For example, if the electronic device 101 moves in a designated direction, the application processor 210 may identify the direction and/or distance in which the electronic device 101 has moved, via an acceleration sensor.

According to an embodiment, the wireless communication chipset 220 may identify a first location of the external device while the application processor 210 is in the low power state, and may acquire information on a second location of the electronic device 101 via the location tracking circuit 230. In an embodiment, the wireless communication chipset 220 may determine whether the electronic device 101 is located within a designated range with respect to the first location. In an embodiment, if the electronic device 101 is located within the designated range, the wireless communication chipset 220 will process a first signal received from the external device, and if the electronic device 101 is located outside the designated range, the application processor 210 will process the first signal received from the external device. In an embodiment, the designated range may refer to a preconfigured geo-fence.

Accordingly, the electronic device 101 according to an embodiment may determine whether a short-range communication connection to the external device is possible via the wireless communication chipset 220, by determining only whether the electronic device 101 is located within the designated range, even without releasing the application processor 210 from the low power state. In addition, the electronic device 101 may determine whether short-range wireless communication via the wireless communication chipset 220 is possible, by determining only whether the electronic device 101 is located within the designated range before receiving a signal from the external device via the wireless communication chipset 220. As a result, the electronic device 101 may reduce power consumption by preventing the application processor 210 from unnecessary releasing of the low power state or preventing the wireless communication chipset 220 from periodic signal reception.

Figure 3:
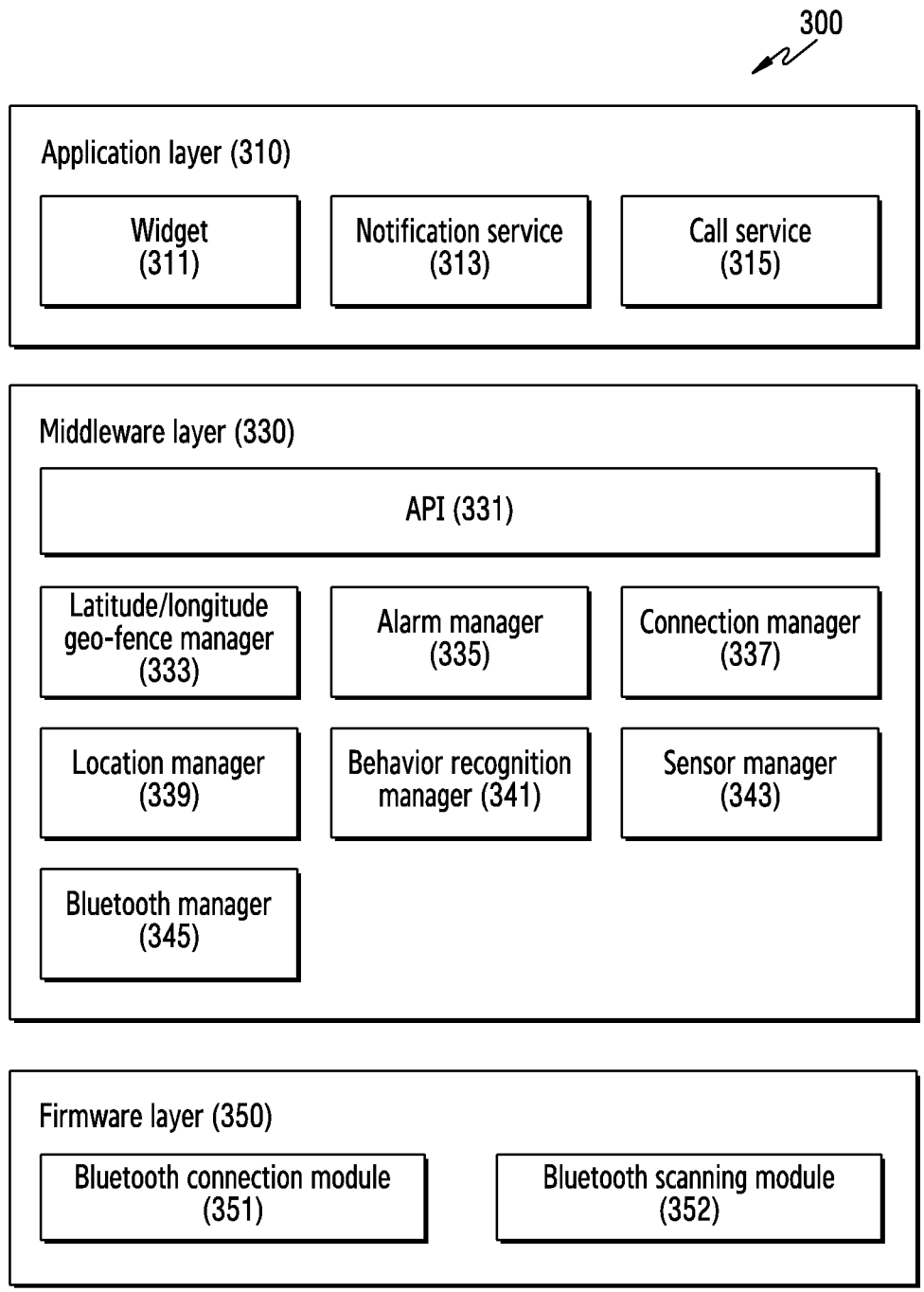
FIG. 3 is a diagram illustrating a block diagram of a software layer of the electronic device according to an exemplary embodiment.

FIG. 3 is a diagram illustrating a block diagram of a software layer of the electronic device according to an exemplary embodiment.

Referring to FIG. 3, at least a part of a software layer 300 according to an embodiment may include, for example, an application layer 310, a middleware layer 330, and/or a firmware layer 350. The software layer 300 according to an embodiment may be stored in advance in, for example, the electronic device 101. As another example, the software layer 300 may be downloaded from an external device or an external server.

According to an embodiment, the application layer 310 may include an operating system which controls resources related to the electronic device 101 and/or various applications (e.g., the application 146 of FIG. 1) running on the operating system. The operating system may include, for example, Android™ iOS™, Windows™, Symbian™, Tizen™, or Bada™.

According to an embodiment, the application layer 310 may provide a function to enable interaction with a user of the electronic device 101. For example, the application layer 310 may provide a function for interaction with a user via a user interface displayed on the display 250. In an embodiment, the application layer 310 may provide a function associated with Bluetooth low energy by using a widget 311. In an embodiment, the application layer 310 may provide a notification service 313 to a user. For example, as will be described later, if the electronic device 101 is located within a designated range from an external device, the application layer 310 may display the user interface, which indicates that a Bluetooth low energy connection between the electronic device 101 and the external device is possible, on the display 250 of the electronic device 101 by using the notification service 313. In an embodiment, when a call signal is received from the external device via a call service 315, the application layer 310 may display, on the display 250 of the electronic device 101, the user interface indicating that the call signal has been received. In an embodiment, in order to use services of the application layer 310, it may be required that the application processor 210 or a main processor (e.g., the main processor 121 of FIG. 1) is not in the low power state. However, the electronic device 101 may implement an always on display (AOD) by using a display driver integrated circuit (DDIC), and the electronic device 101 may implement at least some of the services of the application layer 310 via the AOD even when the application processor 210 is in the low power state.

According to an embodiment, the middleware layer 330 may include an application programming interface (API) 331 which may be commonly used by multiple applications (e.g., the application 146) of the application layer 310. In an embodiment, the middleware layer 330 may include modules configured to provide various services via an API 331. For example, the middleware layer 330 may include a latitude/longitude geo-fence manager 333, an alarm manager 335, a connection manager 337 configured to control a connection to an external device, a location manager 339 configured to transmit and/or receive information on locations of the electronic device 101 and the external device or measure the locations, a behavior recognition manager 341, a sensor manager 343 configured to control at least one sensor 240 of the electronic device 101, and/or a Bluetooth manager 345 configured to control a short-range communication connection (e.g., Bluetooth low energy) of the electronic device 101, which will be described later in FIG. 6. In an embodiment, the API 331 may include, as an interface for controlling a function provided by the middleware layer 330, for example, at least one interface or function (e.g., a command) for file control, window control, image processing, or text control. In an embodiment, the alarm manager 335 may adjust a low power state maintenance period of the application processor 210 or the main processor. In an embodiment, the connection manager 337 may correspond to a module configured to connect a data network and a communication network, and the connection manager 337 may include, for example, a module which enables communication with a server, as well as information on a cell connection state and a data network connection state from a processor which controls Wi-Fi. In an embodiment, the location manager 339 may acquire information on a location via a location provider (e.g., a GNSS or a network location provider (NLP)). The NLP may provide a location by using the CPS and/or WPS based on cellular communication of the wireless communication chipset 220 described above in FIG. 2. In an embodiment, the sensor manager 343 may acquire information on movement of the electronic device 101 from at least one sensor 240. In an embodiment, the behavior recognition manager 341 may correspond to a module configured to estimate a user's activity by acquiring information on movement of the electronic device 101 from the sensor manager 343. For example, the behavior recognition manager 341 may estimate a situation on whether a user is walking, running, or riding a bicycle or a car, based on information on the movement of the electronic device 101, which is acquired from the sensor manager 343.

According to an embodiment, the firmware layer 350 may include a Bluetooth connection module 351 and/or a Bluetooth scanning module 352. In an embodiment, the firmware layer 350 may be executed only via the wireless communication chipset 220. For example, the wireless communication chipset 220 may include the separate sub-processor 221, and the sub-processor 221 may establish a communication connection to an external device via the Bluetooth connection module 351 even when the application processor 210 is in the low power state. As another example, the sub-processor 221 may receive a signal, which is transmitted by an external device to detect the electronic device 101, via the Bluetooth scanning module 352 even when the application processor 210 is in the low power state. As another example, the wireless communication chipset 220 may transfer, to the application processor 210, information on an external device (e.g., the electronic device 102 of FIG. 1) with which a short-range communication connection is established.

Figure 4:
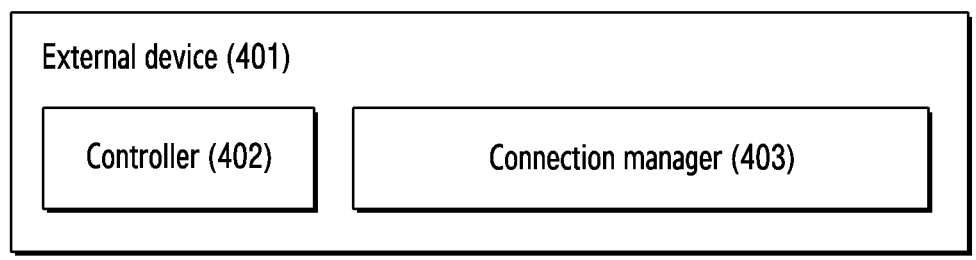
FIG. 4 is a diagram illustrating an external device according to an exemplary embodiment.

FIG. 4 is a diagram for illustrating an external device according to an exemplary embodiment.

Referring to FIG. 4, an external device 401 according to an embodiment may be disposed at a fixed location at a designated time point. For example, the external device 401 may be fixed at a first location at a point in time when the electronic device 101 receives a signal from the external device 401 via the Bluetooth scanning module 352. In an example, information on the first location of the external device 401 may be stored in a memory (e.g., the memory 130 of FIG. 1) of the electronic device 101.

According to an embodiment, the external device 401 may correspond to various types of devices. For example, the external device 401 may correspond to a portable terminal (e.g., a bar-type electronic device, a foldable electronic device, or a rollable electronic device). As another example, the external device 401 may correspond to a wearable device (e.g., a wireless earphone or a smart watch). As another example, the external device 401 may be a car or other means of transportation (e.g., a train or an airplane) which is stopped at a designated time. As another example, the external device 401 may correspond to a television, a refrigerator, and/or a washing machine. As a result, the external device 401 may correspond to a device capable of establishing a communication connection to the electronic device 101.

According to an embodiment, the external device 401 may include a controller 402 and/or a connection manager 403. In an embodiment, the controller 402 may correspond to a module configured to control an operation of the external device 401. The controller 402 may establish a communication connection to the electronic device 101 and/or additional external devices via the connection manager 403, and may transmit and/or receive data. In an embodiment, the controller 402 may control the operation of the external device 401, based on information received via the connection manager 403. For example, the external device 401 may correspond to a wireless earphone, and the controller 402 may receive a signal including information on volume control of a speaker of the external device 401 from the electronic device 101 via the connection manager 403. The controller 402 may control the volume of the external device 401, based on the information on the volume control of the speaker. In an embodiment, the connection manager 403 may correspond to a module configured to control a wireless connection between the external device 401 and the electronic device 101, and the connection manager 403 may control a wireless connection between the external device 401 and an additional external device. In an embodiment, the connection manager 403 may establish various wireless communications other than Bluetooth communication. The connection manager 403 may establish a Bluetooth low energy communication connection to the electronic device 101 by transmitting a signal (e.g., an advertising signal or a scanning signal) to the electronic device 101.

Figure 5A:
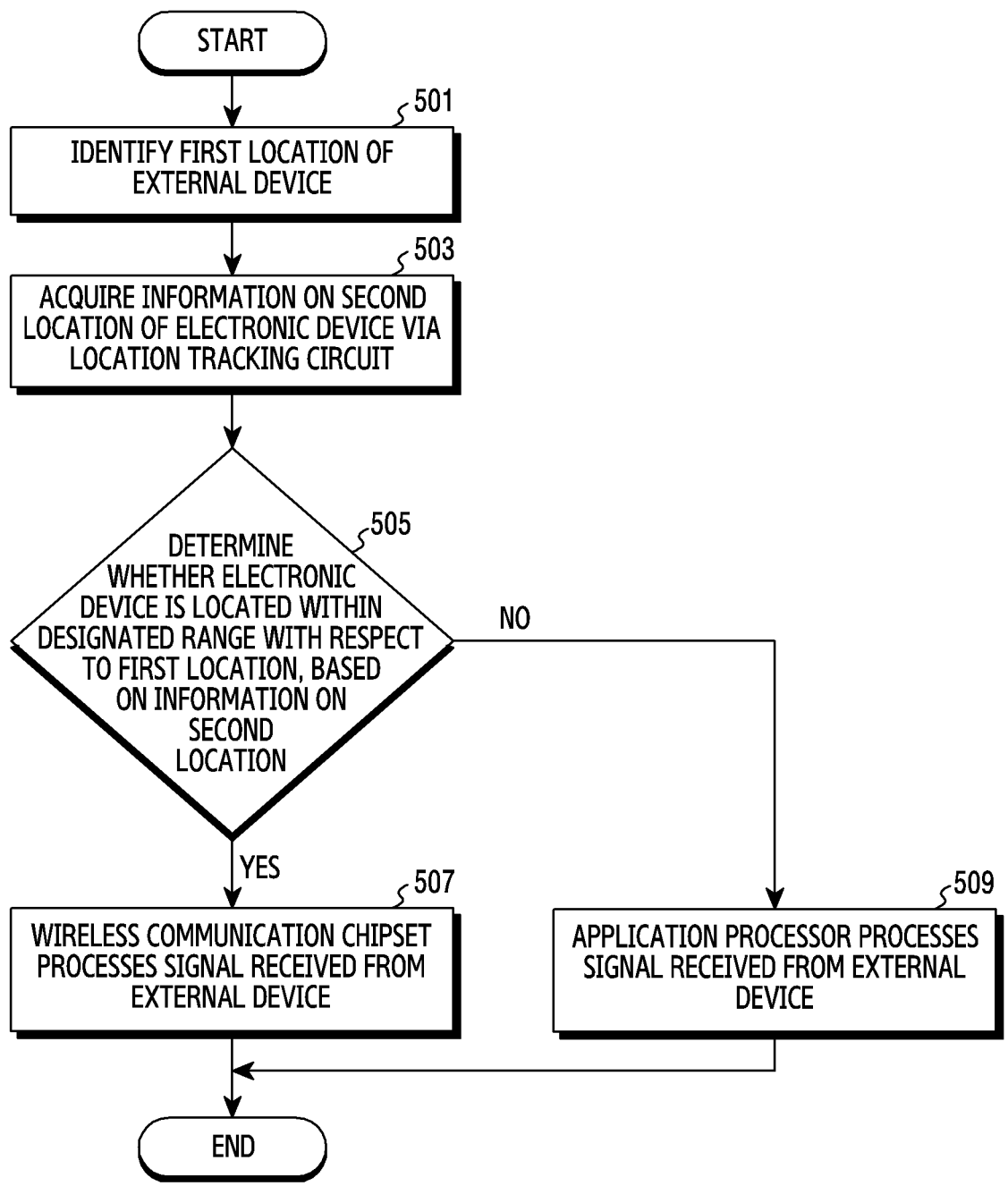
FIG. 5A is a flowchart diagram illustrating an operation in which a wireless communication chipset determines whether a wireless communication connection is possible between the electronic device and the external device by using location information of the electronic device and external device according to an embodiment.

FIG. 5A is a flowchart diagram illustrating an operation in which the wireless communication chipset determines whether a wireless communication connection is possible between the electronic device and the external device by using location information of the electronic device and external device, according to an embodiment.

Referring to FIG. 5A, the wireless communication chipset 220 according to an embodiment may identify a first location of the external device 401 in operation 501. For example, the memory 130 of the electronic device 101 may store information on the first location of the external device 401, and the wireless communication chipset 220 may acquire information on the first location of the external device 401 from the memory 130. As another example, information on the first location of the external device 401 may be stored in an external server (e.g., the server 108 in FIG. 1) of the electronic device 101, and the wireless communication chipset 220 may acquire information on the first location of the external device 401 from the external server.

According to an embodiment, the wireless communication chipset 220 may acquire information on a second location of the electronic device 101 via the location tracking circuit 230 in operation 503. In an embodiment, the wireless communication chipset 220 may acquire information on the second location of the electronic device 101 via various methods. For example, the wireless communication chipset 220 may acquire information on the second location of the electronic device 101 via a global navigation satellite system (GNSS) (e.g., a global positioning system (GPS)) scheme, a cellular positioning system (CPS) scheme, or a Wi-Fi positioning system (WPS) scheme.

According to an embodiment, in operation 505, the wireless communication chipset 220 may determine, based on information on the second location of the electronic device 101, whether the electronic device 101 is located within a designated range (e.g., a first range) based on the first location. In an embodiment, the designated range (e.g., the first range) may refer to a range in which the wireless communication chipset 220 may receive a signal (e.g., an advertising signal) of the external device 401 while the application processor 210 is in the low power state. The designated range may correspond to a geo-fence.

According to an embodiment, when the electronic device 101 is located within the designated range, the wireless communication chipset 220 may process a signal received from the external device 401, in operation 507. In an embodiment, the fact that the electronic device 101 is located within the designated range may indicate that the wireless communication chipset 220 may receive and process a signal without a need to release the application processor 210 from the low power state.

In an embodiment, when the electronic device 101 is located outside the designated range, the application processor 210 may process a signal received from the external device 401, in operation 509. In an embodiment, the fact that the electronic device 101 is located outside the designated range may indicate that the application processor 210 needs to receive and process the signal by releasing the application processor 210 from the low power state.

Accordingly, the electronic device 101 may determine whether the electronic device 101 is located within the designated range of the external device 401, even without receiving a signal from the external device 401, thereby determining whether a signal can be received from the external device 401 and processed via the wireless communication chipset 220 while the application processor 210 is in the low power state.

The electronic device 101 may reduce power consumption by preventing the wireless communication chipset 220 from being controlled to receive a signal from the external device even at a distance in which it is difficult to establish a Bluetooth low energy communication connection to the external device.

For example, if the determination of whether the electronic device 101 is located within the designated range is not preceded, even though the electronic device 101 and the external device are at locations where it is difficult to establish a short-range communication connection, the sub-processor 221 may control the wireless communication circuit 222 to periodically receive a signal from the external device. As the wireless communication circuit 222 is controlled to periodically receive a signal even though a communication connection is difficult, the electronic device 101 may consume unnecessary power. On the other hand, if the determination of whether the electronic device 101 is located within the designated range precedes, the sub-processor 221 may reduce power consumption by preventing, based on the determination, the wireless communication circuit 222 from operating to receive an additional signal when the wireless communication circuit 222 fails to receive a signal from the external device.

Bluetooth low energy communication between the electronic device 101 and the external device has been described as an example, but the technical idea disclosed in the document may actually be applied to various wireless communication schemes other than Bluetooth low energy communication. For example, the technical idea disclosed in the document may be applied to Bluetooth communication, near field communication (NFC), and/or Wi-Fi communication.

Figure 5B:
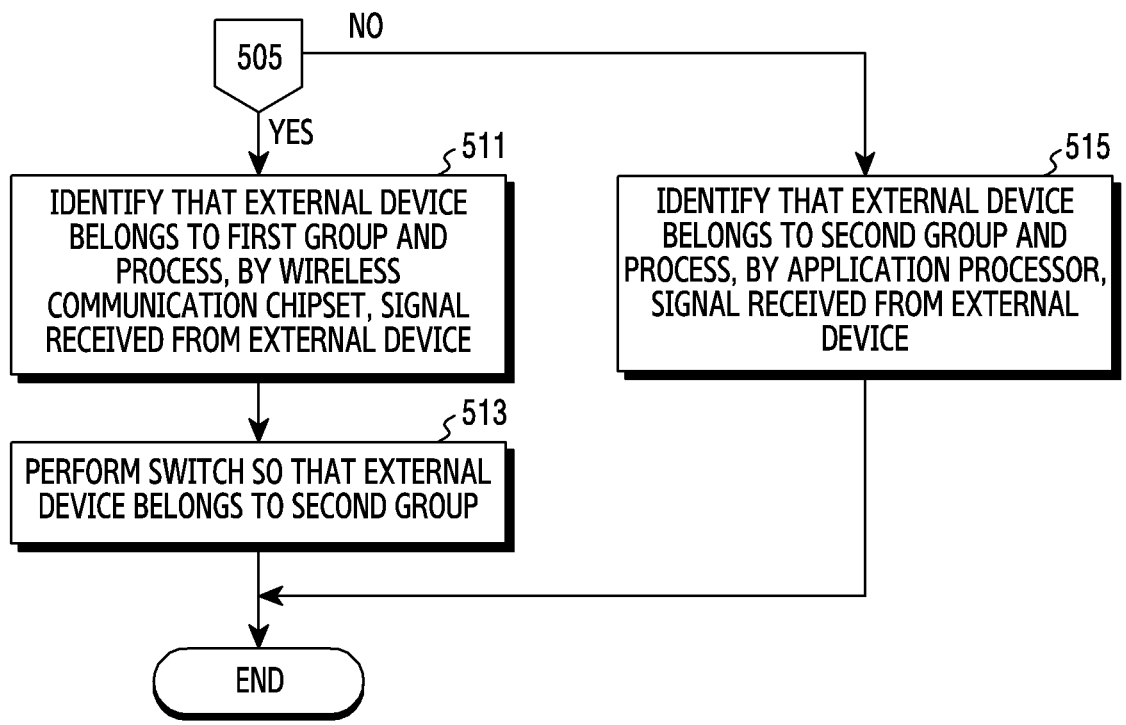
FIG. 5B is a flowchart diagram illustrating an operation of identifying that the external device belongs to a first group or a second group, according to an embodiment.

FIG. 5B is a diagram for illustrating an operation of identifying the external device as a first group or a second group, according to an embodiment.

Referring to FIG. 5B, in operation 511, if the electronic device 101 is located within a range (e.g., a first range) designated based on the first location of the external device 401, the wireless communication chipset 220 according to an embodiment may identify that the external device 401 belongs to a first group and process a signal received from the external device. In an embodiment, among external devices, the first group may refer to a group (or list) of external devices configured so that signals received from the external devices by the electronic device 101 are processed via the wireless communication chipset 220.

According to an embodiment, the wireless communication chipset 220 may switch the external device 401 to a second group in operation 513. For example, the wireless communication chipset 220 may receive and process a first signal from the external device 401 identified to be in the first group. In an example, the wireless communication chipset 220 may process the first signal and then may switch the external device 401 from the first group to the second group. In an embodiment, among external devices, the second group may refer to a group (or list) of external devices configured so that the electronic device 101 causes signals received from the group are processed via the application processor 210. As a result, switching the external device from the first group to the second group may refer to receiving a second signal from the external device only after the application processor 210 is released from the low power state. Accordingly, the electronic device 101 may prevent, by switching the external device to the second group, the wireless communication chipset 220 from periodically receiving a signal from the external device 401 after receiving the first signal, and therefore the electronic device 101 may reduce power consumption.

According to an embodiment, when the electronic device 101 is located outside the designated range, the wireless communication chipset 220 may identify that the external device 401 belongs to the second group, and the application processor 210 released from the low power state may process the signal received from the external device 401, in operation 515.

Figure 6:
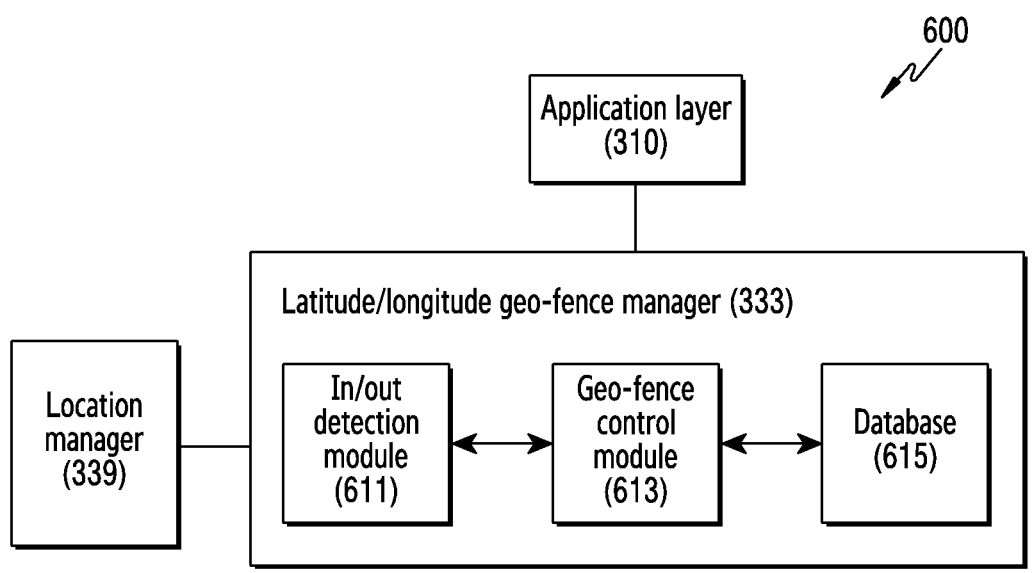
FIG. 6 is a diagram illustrating modules configured to determine whether the electronic device is located within a designated range from the external device, according to an embodiment.

FIG. 6 is a diagram illustrating modules configured to determine whether the electronic device is located within a designated range from the external device, according to an embodiment.

Referring to FIG. 6, the application layer 310 according to an embodiment may be configured so that, by detecting an in/out (or enter/exit) event of the electronic device 101 with respect to a range (e.g., a first range) designated based on a designated location (e.g., a first location of the external device 401), the electronic device 101 may perform geo-fence service. The first location of the external device 401 may be determined based on a latitude and/or longitude at which the external device 401 is located. In an embodiment, the application layer 310 may determine, as a geo-fence, an area within the designated range (e.g., the first range) from the first location of the external device 401. For example, the application layer 310 may identify a maximum distance in which a signal (e.g., an advertising signal) of the external device 401 is transmittable, and based on the identified maximum transmittable distance, the designated range (e.g., the first range) may be determined as a geo-fence. For example, the geo-fence may be substantially equal to or greater than the maximum distance in which a signal of the external device 401 is transmittable.

According to an embodiment, the application layer 310 may receive, from the latitude/longitude geo-fence manager 333, a notification of the electronic device 101 entering the geo-fence. According to an embodiment, the application layer 310 may receive, from the latitude/longitude geo-fence manager 333, a notification of the electronic device 101 exiting from the geo-fence.

According to an embodiment, the location manager 339 may be a module configured to manage location information of the electronic device 101. In an embodiment, the location manager 339 may receive a request for second location information of the electronic device 101 from the latitude/longitude geo-fence manager 333 and, in response to the request, may request a positioning system to measure a second location of the electronic device 101. In an embodiment, the location manager 339 may receive information on the second location of the electronic device 101 from the positioning system. The location manager 339 may transmit the received information on the second location of the electronic device 101 to the latitude/longitude geo-fence manager 333. In an embodiment, the positioning system may include at least one of a GNSS system (e.g., a GPS system), a WPS system, and a CPS system.

According to an embodiment, the latitude/longitude geo-fence manager 333 may determine whether the electronic device 101 has entered the geo-fence, in order to stably provide a geo-fence service. In an embodiment, the latitude/longitude geo-fence manager 333 may determine whether the electronic device 101 has exited to the outside of the geo-fence, in order to stably provide the geo-fence service.

In an embodiment, the latitude/longitude geo-fence manager 333 may transmit, to the application layer 310, an event notification for the geo-fence of the electronic device 101. In an embodiment, the event notification for the geo-fence may include at least one of a notification that the electronic device 101 enters the inside of the geo-fence and a notification that the electronic device 101 exits to the outside of the geo-fence. The latitude/longitude geo-fence manager 333 may include an in/out detection module 611, a geo-fence control module 613, and/or a database 615.

According to an embodiment, the in/out detection module 611 may identify whether the electronic device 101 has entered inside the geo-fence, based on information on the second location of the electronic device 101, which has been received from the location manager 339. In an embodiment, the geo-fence may be determined based on the center coordinates of the geo-fence, which includes a latitude and a longitude, and a predetermined distance (e.g., a radius) from the center coordinates of the geo-fence. In an embodiment, when the electronic device 101 has entered inside the geo-fence, the in/out detection module 611 may determine a state of the electronic device 101 to be "in", based on information on the location of the electronic device 101, which has been received from the location manager 339. In an embodiment, the in/out detection module 611 may transmit a notification to the application layer 310 when the state of the electronic device 101 is determined to be "in" with respect to the geo-fence.

According to an embodiment, when the electronic device 101 has exited to the outside of the geo-fence, the in/out detection module 611 may determine the state of the electronic device 101 to be "out", based on information on the location of the electronic device 101, which has been received from the location manager 339. In an embodiment, the in/out detection module 611 may transmit a notification to the application layer 310 when the state of the electronic device 101 is determined to be "out" with respect to the geo-fence. In an embodiment, by using transmission of a notification to the application layer 310 when the state of the electronic device 101 is determined to be "in" or "out" with respect to the geo-fence, the electronic device 101 may execute, when arrived at a specific place, an event informing a user of arrival at the specific place. For example, the event may include displaying, on the display 250 of the electronic device 101, a user interface informing of arrival at the specific place, outputting a voice or a notification sound indicating arrival at the specific place, or vibrating the electronic device 101.

According to an embodiment, the in/out detection module 611 may perform monitoring on a registered geo-fence. In an embodiment, the in/out detection module 611 may receive information on a changed geo-fence from the geo-fence control module 613. In an embodiment, information on the changed geo-fence may include information on a change in the first location of the external device 401 located at the center of the geo-fence or information on a change in the size of the designated range (e.g., the first range). In an embodiment, the in/out detection module 611 may identify a new geo-fence, based on the received information on the changed geo-fence. For example, if the external device 401 is changed from the first location to a third location, the in/out detection module 611 may identify a new geo-fence based on the third location. In an embodiment, the in/out detection module 611 may identify in/out of the electronic device 101 with respect to the new geo-fence. For example, in a case where the external device 401 is a mobility device (e.g., a car), when the external device 401 (e.g., a car) parked at the first location moves and then parks at the third location, the in/out detection module 611 may identify a new geo-fence, based on the third location from a point in time when the external device 401 is parked at the third location, and may identify in/out of the electronic device 101 with respect to the new geo-fence.

According to an embodiment, the geo-fence control module 613 may control a range of the geo-fence in order to stably provide the geo-fence service. For example, the geo-fence control module 613 may change a configuration of the geo-fence by changing the range of the geo-fence. As another example, the geo-fence control module 613 may change the configuration of the geo-fence by changing the center of the geo-fence. In an embodiment, the geo-fence control module 613 may transmit information on the changed geo-fence to the in/out detection module 611. In an embodiment, the geo-fence control module 613 may configure the geo-fence, based on a relative distance between the external device 401 and the electronic device 101. For example, the geo-fence control module 613 may configure the geo-fence, based on the first location in consideration of the first location on the latitude/longitude of the external device 401. If the first location on the latitude/longitude of the external device 401 has a slight error, the geo-fence control module 613 may configure the geo-fence of the external device 401, based on the relative distance between the external device 401 and the electronic device 101. In an embodiment, when the range of the geo-fence is configured, the geo-fence control module 613 may configure the range in consideration of a distance in which the external device 401 can transmit a signal for a Bluetooth low energy communication connection, a precision of the geo-fence based on the latitude/longitude, and/or possibility of an error in information on the first location of the external device 401. When an error is identified in the determined geo-fence of the external device 401, the geo-fence control module 613 may configure a changed geo-fence by applying the error.

According to an embodiment, the database 615 may store the received information on the second location of the electronic device 101. In an embodiment, the database 615 may receive information on the second location of the electronic device 101 from the geo-fence control module 613. In an embodiment, information on the second location may include at least one of latitude, longitude, an accuracy, a measurement time point (timestamp), a location provider type, a geo-fence identifier (ID), or a combination thereof. In an embodiment, according to a limited capacity of the database 615 or a change in hardware performance of the electronic device 101, the database 615 may delete information, a designated period of which has elapsed, from the stored information on the second location of the electronic device 101.

In the embodiment of FIG. 6, it may be understood that functions performed by the application layer 310, the latitude/longitude geo-fence manager 333, the location manager 339, the in/out detection module 611, the geo-fence control module 613, and/or the database 615 are performed by executing instructions stored in the memory 130 by the wireless communication chipset 220 and/or the application processor 210. In an embodiment, the electronic device 101 may use one or more hardware processing circuits to perform various functions and operations disclosed in the document. For example, the application processor 210 and the location tracking circuit 230 included in the electronic device may be used to implement various embodiments disclosed in the document. The connection relationship between hardware and/or software illustrated in FIG. 6 is for convenience of description, and does not limit the flow and/or direction of data or commands.

Figure 7:
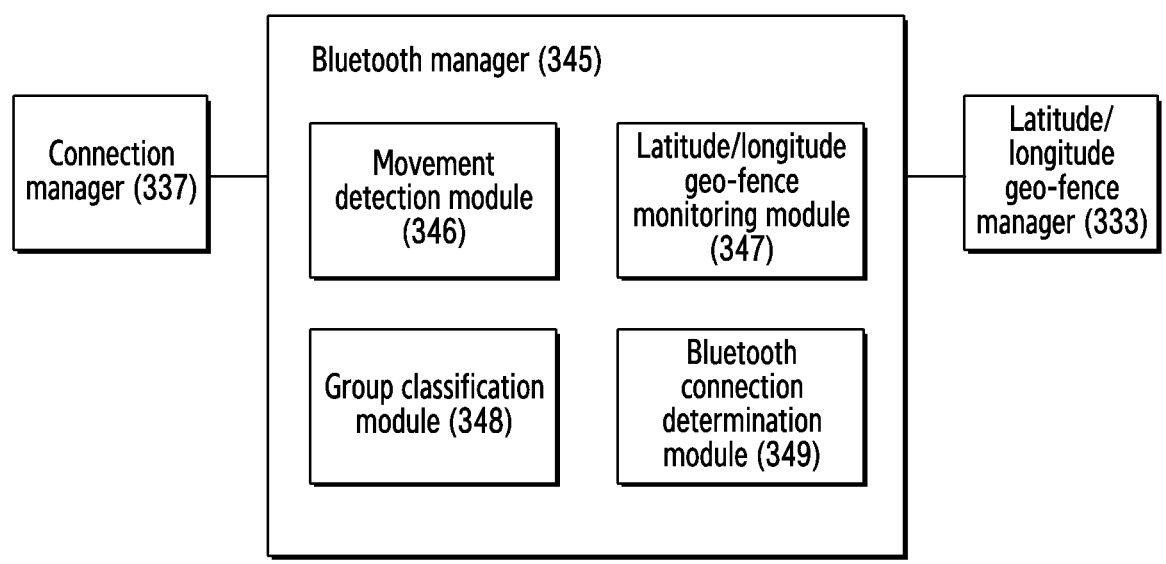
FIG. 7 is a diagram illustrating modules configured to determine whether a Bluetooth low energy connection is established between the electronic device and the external device, according to an embodiment.

FIG. 7 is a diagram illustrating modules configured to determine whether a Bluetooth low energy connection is established between the electronic device and the external device, according to an embodiment.

Referring to FIG. 7, the Bluetooth manager 345 according to an embodiment may include a movement detection module 346, a latitude/longitude geo-fence monitoring module 347, a group classification module 348, and/or a Bluetooth connection determination module 349.

In an embodiment, the movement detection module 346 may identify movement of the electronic device 101. For example, the movement detection module 346 may acquire, via a sensor manager (e.g., the sensor manager 343 of FIG. 3), information on movement of the electronic device 101, which is measured by at least one sensor (e.g., the acceleration sensor and the gyro sensor). The movement detection module 346 may identify movement of the electronic device 101, based on information on the movement of the electronic device 101. The movement detection module 346 may operate when the application processor 210 is released from the low power state.

In an embodiment, the latitude/longitude geo-fence monitoring module 347 may identify whether the electronic device 101 is located within a geo-fence. When the electronic device 101 moves, the latitude/longitude geo-fence monitoring module 347 may identify whether the electronic device 101 is still located within a latitude/longitude geo-fence after the movement. For example, the latitude/longitude geo-fence monitoring module 347 may receive, from the latitude/longitude geo-fence manager 333, information on whether the electronic device 101 is located within the latitude/longitude geo-fence, and may identify whether the electronic device 101 is located within the geo-fence. As another example, when the electronic device 101 moves from a second location to a third location, the latitude/longitude geo-fence monitoring module 347 may receive, from the latitude/longitude geo-fence manager 333, information on whether the electronic device 101 at the third location is still located within the geo-fence, so as to identify whether the electronic device 101 that has moved to the third location is located within the geo-fence.

In an embodiment, the Bluetooth connection determination module 349 may determine, via the latitude/longitude geo-fence monitoring module 347, whether the electronic device 101 is within a range in which a Bluetooth low energy connection to the external device 401 is possible. For example, the Bluetooth connection determination module 349 may acquire, from the latitude/longitude geo-fence monitoring module 347, information indicating that the electronic device 101 is located within the geo-fence. In an example, the Bluetooth connection determination module 349 may determine that the electronic device 101 is able to establish a Bluetooth low energy connection to the external device 401. Accordingly, the Bluetooth connection determination module 349 may request the connection manager 337 to receive a signal (e.g., an advertising signal) from the external device 401.

As another example, the Bluetooth connection determination module 349 may acquire, from the latitude/longitude geo-fence monitoring module 347, information indicating that the electronic device 101 is located outside the geo-fence. In an example, the Bluetooth connection determination module 349 may determine that the electronic device 101 is located at a distance in which a Bluetooth low energy connection to the external device 401 is difficult. In this case, the Bluetooth connection determination module 349 may request the connection manager 337 to receive a signal (e.g., an advertising signal) from the external device 401. When the connection manager 337 fails to receive a signal (e.g., an advertising signal) from the external device 401, the Bluetooth connection determination module 349 may identify that a Bluetooth low energy connection cannot be established between the electronic device 101 and the external device 401. As a result, by using the geo-fence to determine a Bluetooth connection, the electronic device 101 may prevent the wireless communication chipset 220 from unnecessarily operating to periodically receive an advertising signal of the external device 401, and accordingly, the electronic device 101 may reduce power consumption. For example, when no geo-fence is used, the electronic device 101 may control the wireless communication chipset 220 to continuously receive an advertising signal of the external device 401 even at a distance in which it is difficult to establish a Bluetooth low energy communication connection, and this may result in unnecessary power consumption. If a signal cannot be received from the external device 401, a time required for the Bluetooth connection determination module 349 to identify that a Bluetooth connection cannot be established may be configured differently depending on the environment of the external device 401 and the electronic device 101. For example, if there are many obstacles preventing signal reception in the vicinity of the electronic device 101, the electronic device 101 may configure the required time to be relatively long. As another example, if there is no obstacle preventing signal reception in the vicinity of the electronic device 101, the electronic device 101 may configure the required time to be relatively short.

In an embodiment, when the Bluetooth connection determination module 349 determines that the electronic device 101 is located within the geo-fence, the electronic device 101 may use information on the location of the electronic device 101 for another service (e.g., geotagging, a current location notification service) provided by the electronic device 101. For example, when the Bluetooth connection determination module 349 determines that the electronic device 101 is located within the geo-fence, this may indicate that reliability of the information on the location of the electronic device 101, which has been used in the determination, is high. Accordingly, the electronic device 101 may use, for another service, the location information of the electronic device 101, which has been used to determine whether the electronic device 101 is located within the geo-fence of the external device 401.

However, when the connection manager 337 receives a signal (e.g., an advertising signal) from the external device 401 even if the electronic device 101 is located outside the geo-fence, the Bluetooth connection determination module 349 may finally determine that a Bluetooth low energy connection between the electronic device 101 and the external device 401 has been established.

According to an embodiment, the group classification module 348 may classify a group of the external device 401, based on whether the external device 401 is located within the geo-fence. For example, the group classification module 348 may identify whether the external device 401 is located within the geo-fence, via the latitude/longitude geo-fence monitoring module 347. In an example, if the external device 401 is located within the geo-fence, the group classification module 348 may identify that the external device 401 belongs to a first group. A signal (e.g., an advertising signal) received from the external device 401 included in the first group may be processed by the wireless communication chipset 220. As another example, if the external device 401 is located outside the geo-fence, the group classification module 348 may identify that the external device 401 belongs to a second group. A signal (e.g., an advertising signal) received from the external device 401 included in the second group may be processed by the application processor 210 released from the low power state. In an embodiment, the group classification module 348 may store, in the memory 130, first external devices belonging to the first group and/or second external devices belonging to the second group. In an embodiment, when the application processor 210 is in the low power state, the number (e.g., 8) of external devices, with which the wireless communication chipset 220 is able to perform Bluetooth low power communication, may be designated, and the number (e.g., 8) of external devices belonging to the first group may be determined according thereto. In an embodiment, the group classification module 348 may switch the external device 401 identified to be the first group to that in the second group, as described with reference to FIG. 5B. Conversely, the group classification module 348 may switch the external device 401 identified to be in the second group to that in the first group.

In the embodiment of FIG. 7, it may be understood that functions performed by the connection manager 337, the Bluetooth manager 345, the latitude/longitude geo-fence manager 333, the movement detection module 346, the latitude/longitude geo-fence monitoring module 347, the group classification module 348, and/or Bluetooth connection determination module 349 are performed by executing instructions stored in the memory 130 by the wireless communication chipset 220 and/or the application processor 210. In an embodiment, the electronic device 101 may use one or more hardware processing circuits to perform various functions and operations disclosed in the document. For example, the application processor 210 and the location tracking circuit 230 included in the electronic device may be used to implement various embodiments disclosed in the document. The connection relationship between hardware and/or software illustrated in FIG. 7 is for convenience of description, and does not limit the flow and/or direction of data or commands.

Figure 8:
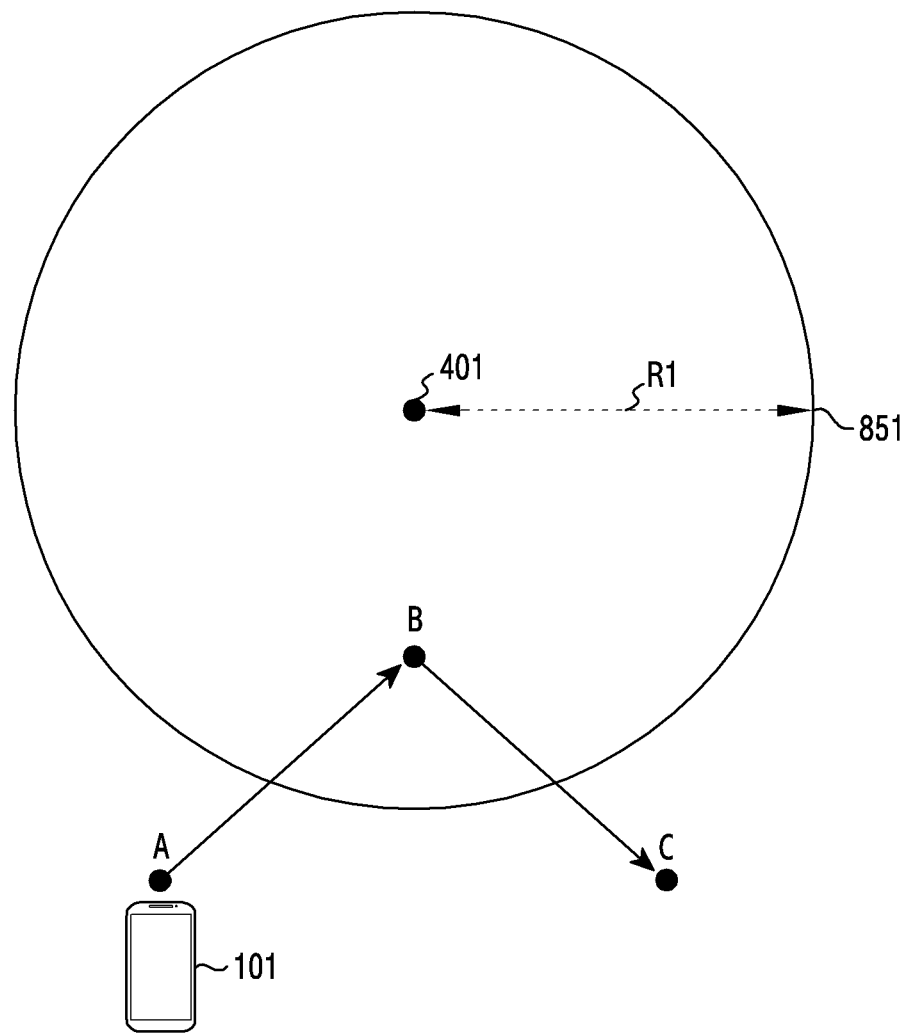
FIG. 8 is a diagram illustrating an example of determining whether a Bluetooth low energy connection is established, depending on whether the electronic device is located within a geo-fence, according to an embodiment.

FIG. 8 is a specific example of determining whether a Bluetooth low energy connection is established, depending on whether the electronic device is located within a geo-fence, according to an embodiment.

Referring to FIG. 8, the wireless communication chipset 220 according to an embodiment may acquire information on a first location of the external device 401 by using the location manager 339.

According to an embodiment, the wireless communication chipset 220 may identify, using the geo-fence control module 613 of the latitude/longitude geo-fence manager 333, a first range having a first radius R1 based on the first location of the external device 401. The first range may correspond to a first geo-fence 851 of the external device 401. In an embodiment, the wireless communication chipset 220 may determine in advance the first radius R1 of the first geo-fence 851 by using the geo-fence control module 613. For example, the first radius R1 of the first geo-fence 851 may be determined based on a distance that a signal (e.g., an advertising signal) transmitted from the external device 401 is able to reach. Although the first range of the first geo-fence 851 illustrated in FIG. 8 is shown as a circle having a designated radius (e.g., the first radius R1), this is merely an example, and the first geo-fence 851 may have various shapes.

According to an embodiment, the wireless communication chipset 220 may determine whether the electronic device 101 is located inside the first geo-fence 851, via the in/out detection module 611. For example, if the electronic device 101 is located at location A, the wireless communication chipset 220 may identify, via the in/out detection module 611, that the electronic device 101 is located outside the first geo-fence 851. As another example, if the electronic device 101 is located at location B, the wireless communication chipset 220 may identify, via the in/out detection module 611, that the electronic device 101 is located inside the first geo-fence 851. In an embodiment, the wireless communication chipset 220 may determine, via the in/out detection module 611, that the electronic device 101 has moved from the inside of the first geo-fence 851 to the outside of the first geo-fence 851. For example, if the electronic device 101 moves from location B to location C, the wireless communication chipset 220 may identify, via the in/out detection module 611, that the electronic device 101 has moved from the inside of the first geo-fence 851 to the outside of the first geo-fence 851. Conversely, if the electronic device 101 moves from location C to location B, the wireless communication chipset 220 may identify, via the in/out detection module 611, that the electronic device 101 has moved from the outside of the first geo-fence 851 to the inside of the first geo-fence 851.

According to an embodiment, the wireless communication chipset 220 may use the Bluetooth connection determination module 349 to determine, based on whether the electronic device 101 is located within the first geo-fence 851, whether the wireless communication chipset 220 is able to establish a Bluetooth low energy communication connection to the external device 401 while the application processor 210 is in the low power state. For example, when the electronic device 101 is at location A, the electronic device 101 is located outside the first geo-fence 851, and the wireless communication chipset 220 may thus determine that the wireless communication chipset 220 is unable to establish a Bluetooth low energy communication connection to the external device 401 while the application processor 210 is in the low power state. However, even in this case, the wireless communication chipset 220 may attempt to receive a signal (e.g., an advertising signal) transmitted from the external device 401, and may finally determine that a Bluetooth low energy communication connection to the external device 401 may be established when wireless communication chipset 220 receives the signal. In an example, the wireless communication chipset 220 may identify that the external device 401 belongs to a second group, by using the group classification module 348. As another example, when the electronic device 101 is at location B, the electronic device 101 is located inside the first geo-fence 851, and the wireless communication chipset 220 may thus determine that the wireless communication chipset 220 is able to establish a Bluetooth low energy communication connection to the external device 401 while the application processor 210 is in the low power state. In an example, the wireless communication chipset 220 may identify that the external device 401 belongs to a first group, by using the group classification module 348.

Figure 9:
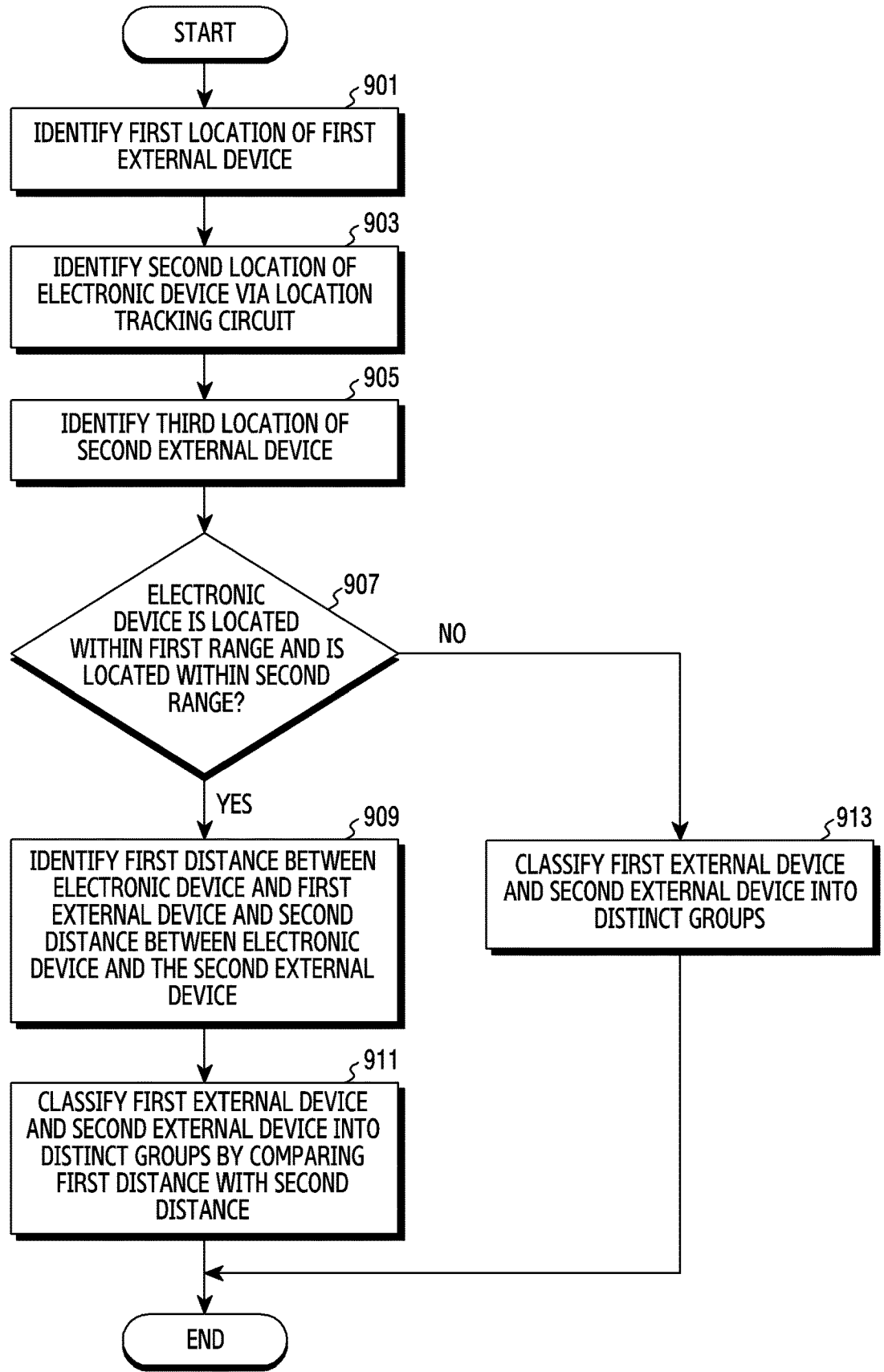
FIG. 9 is a flowchart for illustrating an operation of classifying groups of multiple external devices by comparing distances between the multiple external devices and the electronic device, according to an embodiment.

FIG. 9 is a flowchart for illustrating an operation of classifying groups of multiple external devices by comparing distances between the multiple external devices and the electronic device, according to an embodiment.

Referring to FIG. 9, the wireless communication chipset 220 according to an embodiment may identify a first location of a first external device (e.g., the external device 401) in operation 901. For example, the wireless communication chipset 220 may identify the first location of the external device 401 by acquiring information on the first location of the external device 401 from the memory 130.

According to an embodiment, the wireless communication chipset 220 may identify a second location of the electronic device 101 via the location tracking circuit 230 in operation 903. For example, the wireless communication chipset 220 may receive information on the second location of the electronic device 101 via a GPS circuit, and may identify the second location of the electronic device 101, based on the information on the second location.

According to an embodiment, the wireless communication chipset 220 may identify information on a third location of a second external device in operation 905. For example, the wireless communication chipset 220 may acquire information on a third location of a second external device (e.g., a second external device 1002 of FIG. 10) from the memory 130 so as to identify the third location of the second external device. In the flowchart illustrated in FIG. 9, it is described that the wireless communication chipset 220 identifies the second location of the electronic device 101 in operation 903 and then identifies the third location of the second external device. However, this is merely an example and, in another embodiment, the wireless communication chipset 220 may identify the third location of the second external device and then identify the second location of the electronic device 101.

According to an embodiment, in operation 907, the wireless communication chipset 220 may determine, based on the first location of the first external device, whether the electronic device 101 is located within a first range, and may determine, based on the third location of the second external device, whether the electronic device 101 is located within a second range. In an embodiment, the first range and the second range may be substantially the same, but the disclosed is not limited thereto, and the first range and the second range may be different.

According to an embodiment, if the electronic device 101 is located within the first range with respect to the first location, and the electronic device 101 is located within the second range with respect to the third location, the wireless communication chipset 220 may identify a first distance between the electronic device 101 and the first external device and a second distance between the electronic device 101 and the second external device in operation 909.

According to an embodiment, the wireless communication chipset 220 may classify the first external device and the second external device into distinct groups by comparing the first distance with the second distance, in operation 911. That is, the wireless communication chipset 220 may compare the first distance between the electronic device 101 and the first external device with the second distance between the electronic device 101 and the second external device, so as to identify that an external device (e.g., the first external device) having a relatively close distance belongs to a first group and identify that an external device (e.g., the second external device) having a relatively far distance belongs to a second group.

According to an embodiment, in a case other than a case where the electronic device 101 is located in neither the first range nor the second range, the wireless communication chipset 220 may classify the first external device and the second external device into distinct groups in operation 913. For example, if the electronic device 101 is located in neither the first range nor the second range, the wireless communication chipset 220 may identify that each of the first external device and the second external device belongs to the second group. As another example, if the electronic device 101 is located within the first range but is located outside the second range, the wireless communication chipset 220 may identify that the first external device belongs to the first group and may identify that the second external device belongs to the second group. As another example, if the electronic device 101 is located outside the first range but is located within the second range, the wireless communication chipset 220 may identify that the first external device belongs to the second group and may identify that the second external device belongs to the first group.

Figure 10:
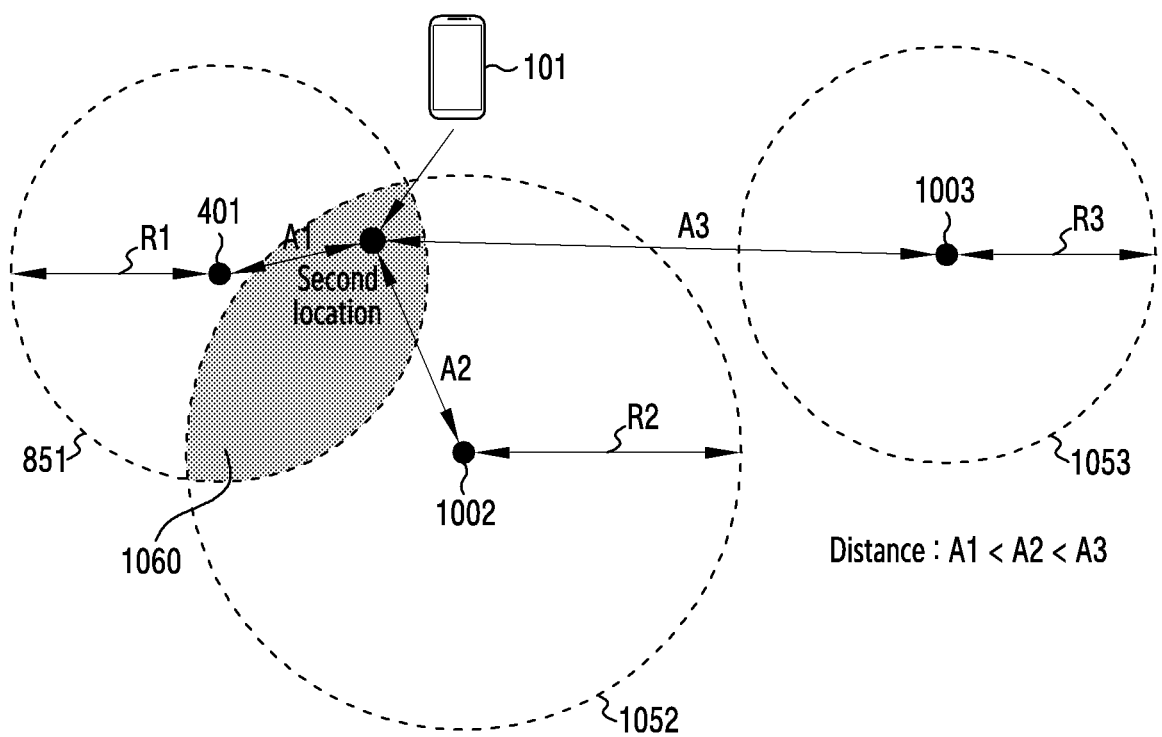
FIG. 10 is a diagram illustrating an example of, when there are multiple external devices, determining, based on a geo-fence, whether the electronic device is able to make connections to the multiple external devices via Bluetooth low energy, according to an embodiment.

FIG. 10 is a diagram for illustrating a specific example of, when there are multiple external devices, determining, based on a geo-fence, whether the electronic device is able to make connections to the multiple external devices via Bluetooth low energy, according to an embodiment.

Referring to FIG. 10, multiple external devices may be disposed around the electronic device 101 according to an embodiment. For example, the first external device 401, a second external device 1002, and/or a third external device 1003 may be disposed around the electronic device 101. In an example, for convenience of description, the external device 401 described above with reference to FIG. 4 to FIG. 9 may be referred to as the first external device 401.

According to an embodiment, each of multiple devices may have a geo-fence having a different radius. For example, the first external device 401 may have the first geo-fence 851 having a first radius RE As another example, the second external device 1002 may have a second geo-fence 1052 having a second radius R2. As another example, the third external device 1003 may have a third geo-fence 1053 having a third radius R3. Although the geo-fences are illustrated in the form of a circle having a designated radius in FIG. 10, this is merely an example for convenience of description, and the geo-fences may actually have various shapes.

According to an embodiment, a second location at which the electronic device 101 is disposed may correspond to the inside of the first geo-fence 851 and the inside of the second geo-fence 1052, and may correspond to the outside of the third geo-fence 1053. In an embodiment, the electronic device 101 at the second location may have a first distance A1 from the first external device 401. The electronic device 101 may have a second distance A2 from the second external device 1002. The electronic device 101 may have a third distance A3 from the third external device 1003.

According to an embodiment, the electronic device 101 is located in the first geo-fence 851 and the second geo-fence 1052, and the wireless communication chipset 220 may thus identify that the first external device 401 and/or the second external device 1002 as belonging to a first group. In an embodiment, while the application processor 210 is in the low power state, the wireless communication chipset 220 may receive a signal (e.g., an advertising signal) from the first external device 401 and/or the second external device 1002, and may process the received signal. In an embodiment, the electronic device 101 may receive and process a signal from the first external device 401 and/or the second external device 1002, and then may switch the first external device 401 and/or the second external device 1002 to a second group. The electronic device 101 is located outside the third geo-fence 1053, and the wireless communication chipset 220 may thus identify that the third external device 1003 belongs to the second group. In an embodiment, the wireless communication chipset 220 may identify that the third external device 1003 is located at a distance in which the wireless communication chipset 220 alone cannot receive a signal. In an embodiment, the application processor 210 released from the low power state may receive a signal (e.g., an advertising signal) from the third external device 1003 and process the signal.

According to an embodiment, the electronic device 101 may identify a common area 1060 of the first geo-fence 851 and the second geo-fence 1052, and may determine that a Bluetooth low energy connection to the second external device 1002 is possible, only by identifying that the electronic device 101 has entered the common area 1060 in the first geo-fences 851 of the first external device 401 without considering the second geo-fence 1052 of the second external device 1002. For example, the electronic device 101 may identify the common area 1060 of the first geo-fence 851 and the second geo-fence 1052, and may store a location of the common area 1060 in the memory 130. In this case, when the electronic device 101 enters the common area 1060 in the first geo-fence 851, it may be determined, without having to consider the presence or absence in the second geo-fence 1052, that the electronic device 101 is within the second geo-fence 1052, and the electronic device 101 may be determined to be at a distance in which a Bluetooth low energy connection to the second external device 1002 is possible. As a result, even if only one of the first geo-fence 851 and the second geo-fence 1052 is identified, the electronic device 101 may determine both whether the electronic device 101 is located within the first geo-fence 851 and whether the electronic device 101 is located within the second geo-fence 1052. For example, when the first external device 401 is a television and the second external device 1002 is a refrigerator, the electronic device 101 may determine whether the electronic device 101 is located within the first geo-fence 851 that is based on the television. When the electronic device 101 is located within the first geo-fence 851 while concurrently being located in the common area 1060, the electronic device 101 may identify that the electronic device 101 is located within the second geo-fence 1052, without having to determine whether the electronic device 101 is located within the second geo-fence 1052 that is based on the refrigerator.

Hereinafter, a specific example of classifying groups of multiple external devices by comparing distances between the multiple external devices and the electronic device, which has been described with reference to FIG. 9, will be described.

According to an embodiment, in order to reduce power consumption of the wireless communication chipset 220, the number (e.g., one) of external devices that may be included in the first group may be limited. Accordingly, even if the electronic device 101 is located within multiple geo-fences corresponding to the multiple external devices, the wireless communication chipset 220 may identify only some of the multiple external devices belong to the first group. In this case, the wireless communication chipset 220 may determine an external device to be identified to be in the first group, based on a relative distance between the external device and the electronic device 101. For example, the electronic device 101 may be located within the first geo-fence 851 and the second geo-fence 1052. However, in order to reduce power consumption, the number of external devices that may be included in the first group may be one, and the wireless communication chipset 220 may identify that only one of the first external device 401 and the second external device 1002 belongs to the first group. In this case, the wireless communication chipset 220 may identify the first distance A1 between the electronic device 101 and the first external device 401 and the second distance A2 between the electronic device 101 and the second external device 1002. In an example, the wireless communication chipset 220 may determine that the first distance A1 is shorter than the second distance A2, and may identify that the first external device 401 having a shorter relative distance belongs to the first group. The second external device 1002 having a longer relative distance may be identified to be in the second group.

Figure 11A:
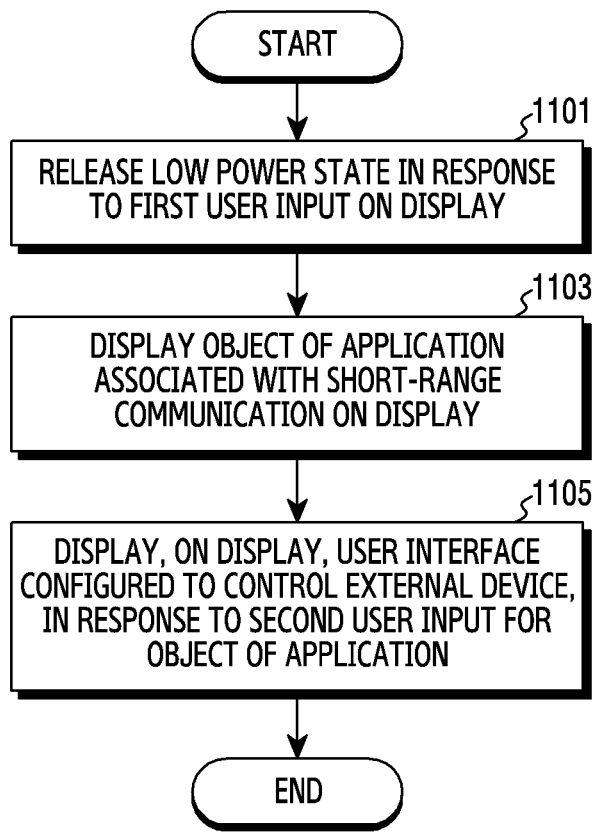
FIG. 11A is a flowchart for illustrating an operation in which an application processor displays, on a display, a user interface enabling a control of an external device connected via Bluetooth low energy communication, according to an embodiment.

FIG. 11A is a flowchart for illustrating an operation in which the application processor displays, on the display, a user interface enabling a control of an external device connected via Bluetooth low energy communication, according to an embodiment.

Referring to FIG. 11A, the application processor 210 according to an embodiment may release the low power state in response to a first user input on the display 250, in operation 1101. In an embodiment, the first user input may include, for example, a touch input and/or a swipe input on the display 250.

In another embodiment, the application processor 210 may release the low power state without the first user input on the display 250. For example, the electronic device 101 may receive a call signal from an external device, may release the application processor 210 from the low power state in response to reception of the call signal, and may display, on the display 250, information (e.g., an external device number, an image associated with the external device, and a name of the external device) related to the external device having transmitted the call signal.

According to an embodiment, the application processor 210 may display an object of an application associated with short-range communication (e.g., Bluetooth low energy communication) on the display 250, in operation 1103. The application associated with short-range communication may refer to an application that provides a user interface configured to control a function of an external device with which a short-distance communication connection to the electronic device 101 has been established. The object may include, for example, an icon, a label, and/or a name indicating the application related to short-range communication. In an embodiment, the object of the application may be displayed in an area of the display 250 at the same time when the display 250 is turned on. For example, the application processor 210 may receive a call signal from the external device when the display 250 is in an OFF state, and in response to reception of the call signal, the application processor 210 may switch the display 250 to an ON state. The application processor 210 may display the object at the same time when the display 250 is switched to the ON state. In another embodiment, the object of the application may be displayed in an area of the display 250 only after a designated time elapses after the display 250 is turned on. For example, the application processor 210 may receive a call signal from the external device when the display 250 is in the OFF state, and in response to reception of the call signal, the application processor 210 may switch the display 250 to the ON state. The application processor 210 may display the object in an area of the display 250 after a designated time (e.g., 10 seconds) elapses after the display 250 is switched to the ON state.

According to an embodiment, in operation 1105, the application processor 210 may display the user interface configured to control the external device 401 on the display 250, in response to a second user input for the object.

Figure 11B:
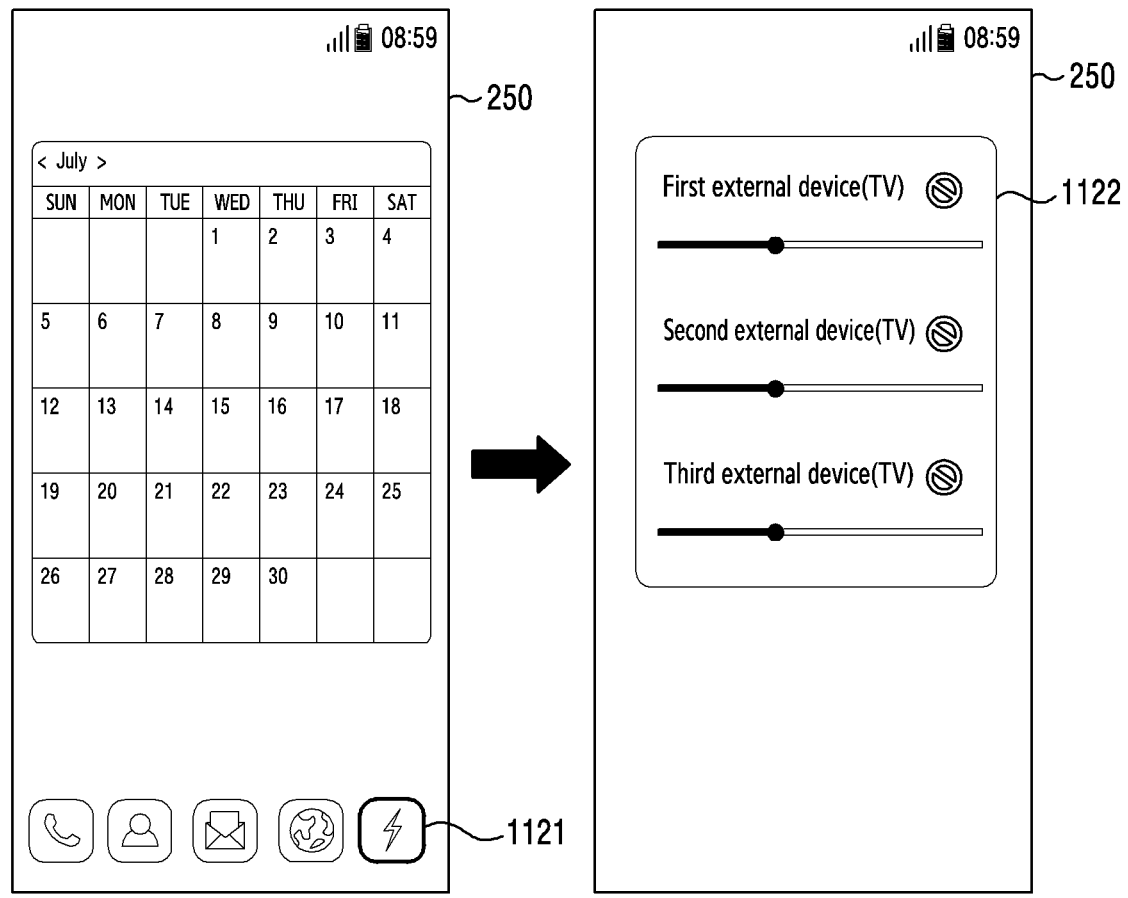
FIG. 11B is a diagram illustrating a user interface enabling the application processor to control, based on a user input on a display, an external device connected via Bluetooth low energy communication, according to an embodiment.

FIG. 11B is a diagram illustrating a user interface enabling the application processor to control, based on a user input on the display, an external device connected via Bluetooth low energy communication, according to an embodiment.

Referring to FIG. 11B, the application processor 210 released from the low power state according to an embodiment may display, on the display 250, an object (e.g., an icon) 1121 of an application associated with short-range communication. The application associated with the short-distance communication may refer to an application that provides a user interface enabling a control of an external device. For example, when it is identified that the electronic device 101 has entered a geo-fence of an external device (e.g., a TV), the electronic device 101 may establish a communication connection to the external device (e.g., a TV). The application associated with short-distance communication may display a user interface enabling a control of an external device (e.g., a TV) on the display, and a user may control, for example, the volume of the external device (e.g., a TV) via the application associated with short-distance communication.

According to an embodiment, the application processor 210 may display a user interface 1122 on the display 250 in response to a user input for the object 1121. The user interface 1122 may include an object (e.g., an icon, a name, and a status bar) which controls an external device (or a function of the external device) which has established a communication connection with the electronic device 101. For example, when the electronic device 101 is connected to a first external device (e.g., a TV), a second external device (e.g., a TV), and a third external device (e.g., a TV), the user interface 1122 may include an object (e.g., mute and a volume bar) enabling a control of speaker volumes of the first external device, the second external device, and the third external device. In an embodiment, the user interface 1122 may be displayed in an area of the display 250 at the same time when a user input for the object 1121 is identified. For example, the application processor 210 may display the user interface 1122 on the display 250 at the same time when a user input for the object 1121 is identified. In another embodiment, the user interface 1122 may be displayed in an area of the display 250 only after a designated time elapses after a user input for the object 1121 is identified. For example, the application processor 210 may display the user interface 1122 in an area of the display 250 after a designated time (e.g., 10 seconds) elapses after a user input for the object 1121 is identified.

In an embodiment, in response to a user input to the user interface 1122, the application processor 210 may control external devices connected to the electronic device 101 via Bluetooth low energy communication. For example, the application processor 210 may control a level of volume emitted from a speaker of the external device (e.g., the first external device) in response to a user input (e.g., a touch input for a mute icon or a touch input for a volume bar) for the user interface 1122.

Figure 11C:
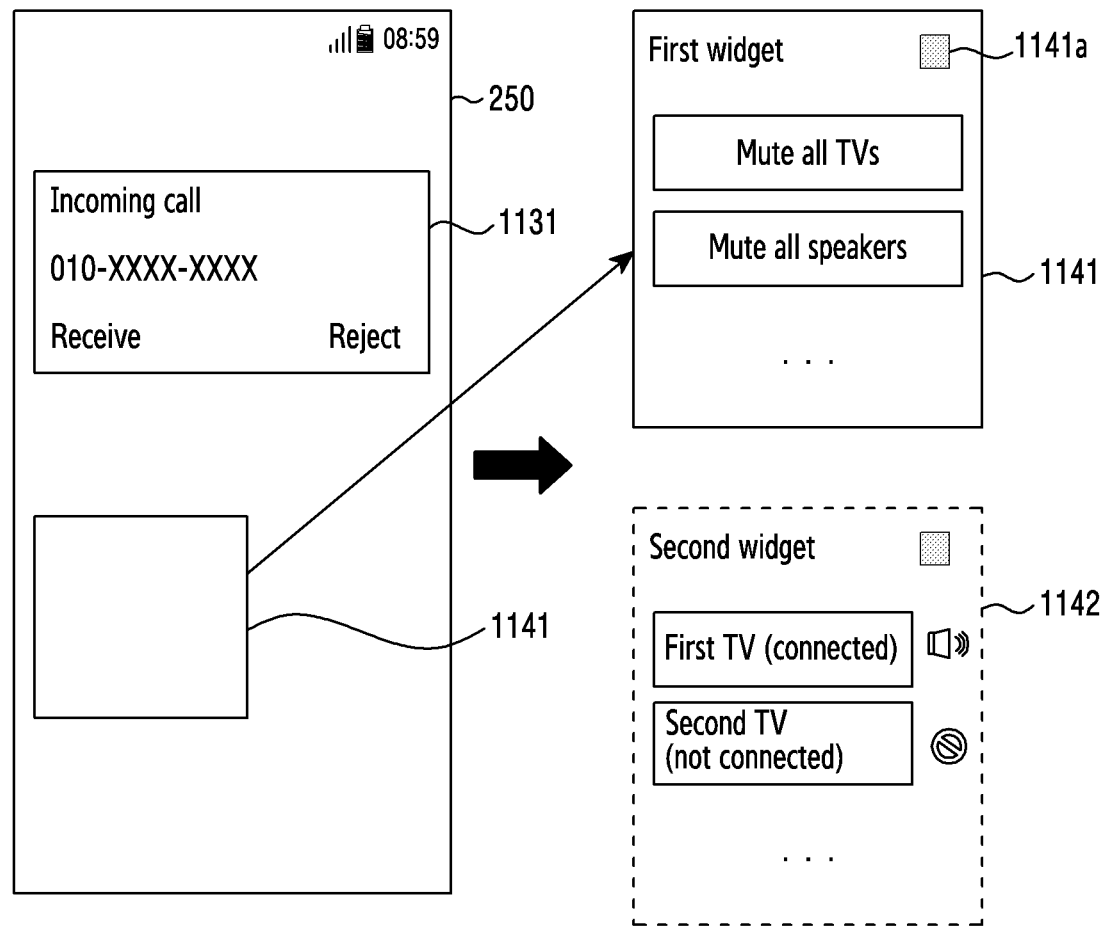
FIG. 11C is a diagram illustrating a user interface enabling the application processor to control an external device connected via Bluetooth low energy communication, upon reception of a call signal from the external device, according to an embodiment.

FIG. 11C is a diagram illustrating a user interface enabling the application processor to control an external device connected via Bluetooth low energy communication, upon reception of a call signal from the external device, according to an embodiment.

Referring to FIG. 11C, the application processor 210 according to an embodiment may release the low power state upon reception of a call signal from an external device, and may display, on the display 250, a first user interface 1131 including information on the external device (e.g., a phone number of the external device).

According to an embodiment, the application processor 210 may display, in an area of the display 250, a widget enabling a control of functions of external devices which have established communication connections to the electronic device 101. For example, the application processor 210 may display, on the display 250, a first widget 1141 enabling a control of the volume for each type (e.g., a TV speaker) of an external device which has established a wireless communication connection with the electronic device 101. In an example, the first widget 1141 may include, for example, a user interface enabling simultaneous muting of TVs connected to the electronic device 101 or simultaneous muting of speakers connected to the electronic device 101. As another example, the application processor 210 may display, in an area of the display 250, a second widget 1142 enabling a control of each of external devices (e.g., a first TV and a second TV) connected to the electronic device 101. In an embodiment, the electronic device 101 may determine whether the electronic device 101 is located within geo-fences of external devices before establishing communication connections with the external devices, and may receive, based on the determination, signals (e.g., an advertising signal) for establishment of communication connections from the external devices. In an embodiment, the first widget 1141 may be displayed in an area of the display 250 at the same time when the display 250 is turned on. For example, the application processor 210 may receive a call signal from an external device when the display 250 is in an OFF state, and in response to reception of the call signal, the application processor 210 may switch the display 250 to an ON state. The application processor 210 may display the first widget 1141 at the same time when the display 250 is switched to the ON state. In another embodiment, the first widget 1141 may be displayed in an area of the display 250 only after a designated time elapses after the display 250 is turned on. For example, the application processor 210 may receive a call signal from the external device when the display 250 is in the OFF state, and in response to reception of the call signal, the application processor 210 may switch the display 250 to the ON state. The application processor 210 may display the first widget 1141 in an area of the display 250 after a designated time (e.g., 10 seconds) elapses after the display 250 is switched to the ON state.

The location, illustrated in FIG. 11C, of the area on the display 250, in which the first widget 1141 is displayed, is merely an example for convenience of description, and in fact, the location of the area on the display 250, in which the first widget 1141 is displayed, may vary and is movable on the display 250 according to a user's touch input.

According to an embodiment, the first widget 1141 may include a first widget switch button 1141*a*, and the application processor 210 may change the first widget 1141 being displayed on the display 250 to the second widget 1142 in response to a user's input to the first widget switch button 1141*a*.

The aforementioned change from the first widget 1141 to the second widget 1142 is merely an example, and the application processor 210 may change the first widget 1141 to various types of widgets in response to a user input.

Figure 12:
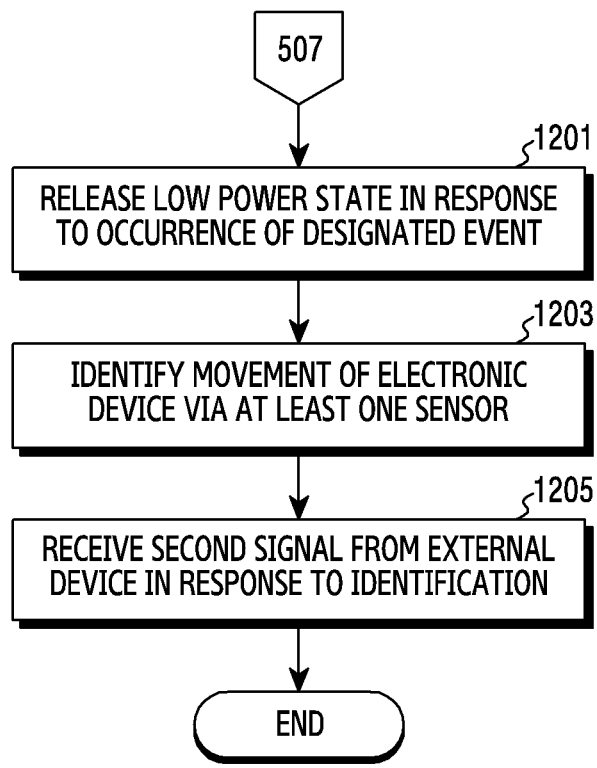
FIG. 12 is a flowchart for illustrating an operation of receiving a second signal from the external device according to movement of the electronic device in a state where the electronic device receives a first signal from the external device, according to an embodiment.

FIG. 12 is a flowchart for illustrating an operation of receiving a second signal from the external device according to movement of the electronic device in a state where the electronic device receives a first signal from the external device, according to an embodiment.

Referring to FIG. 12, the application processor 210 according to an embodiment may release the low power state in response to occurrence of a designated event, in operation 1201. For example, the application processor 210 may release the low power state in response to a user input to the display 250. As another example, the application processor 210 may release the low power state in response to a request from the sub-processor 221 of the wireless communication chipset 220. As another example, when movement of the electronic device 101 is identified, the application processor 210 may release the low power state. In another embodiment, the application processor 210 may release the low power state according to a designated period even if there is no separate occurrence of a designated event.

According to an embodiment, the application processor 210 may identify movement of the electronic device 101 via at least one sensor 240 in operation 1203. For example, the application processor 210 may be electrically connected to the acceleration sensor and/or the gyro sensor, and may identify movement of the electronic device 101 via the acceleration sensor and/or the gyro sensor.

According to an embodiment, in operation 1205, the application processor 210 may receive a second signal from the external device 401 in response to the identification. In an embodiment, reasons that the application processor 210 receives a second signal (e.g., an advertising signal) of the external device 401 when movement of the electronic device 101 is identified are as follows. For example, the electronic device 101 may be located within a first range from the external device 401 and may be thus in a state where a Bluetooth low energy connection to the wireless communication chipset 220 is possible while the application processor 210 is in the low power state. However, as the electronic device 101 moves, the electronic device 101 may move outside the first range. In this case, the application processor 210 may need to determine whether the external device 401 is still capable of establishing a Bluetooth low energy connection to the electronic device 101 despite the movement. Accordingly, the application processor 210 may receive a second signal (e.g., an advertising signal) from the external device 401 in response to identification of the movement of the electronic device 101. In an embodiment, the application processor 210 may process the second signal received from the external device 401.

According to an embodiment, from a first time point at which the wireless communication chipset 220 has processed the first signal received from the external device 401 in operation 507, to a second time point at which the application processor 210 released from the low power state receives the second signal from the external device 401 in operation 1205, the wireless communication chipset 220 may not receive an additional signal (e.g., an advertising signal) from the external device 401. As the wireless communication chipset 220 does not receive a signal from the external device 401 from the first time point to the second time point, the electronic device 101 may reduce power consumption.

Figure 13:
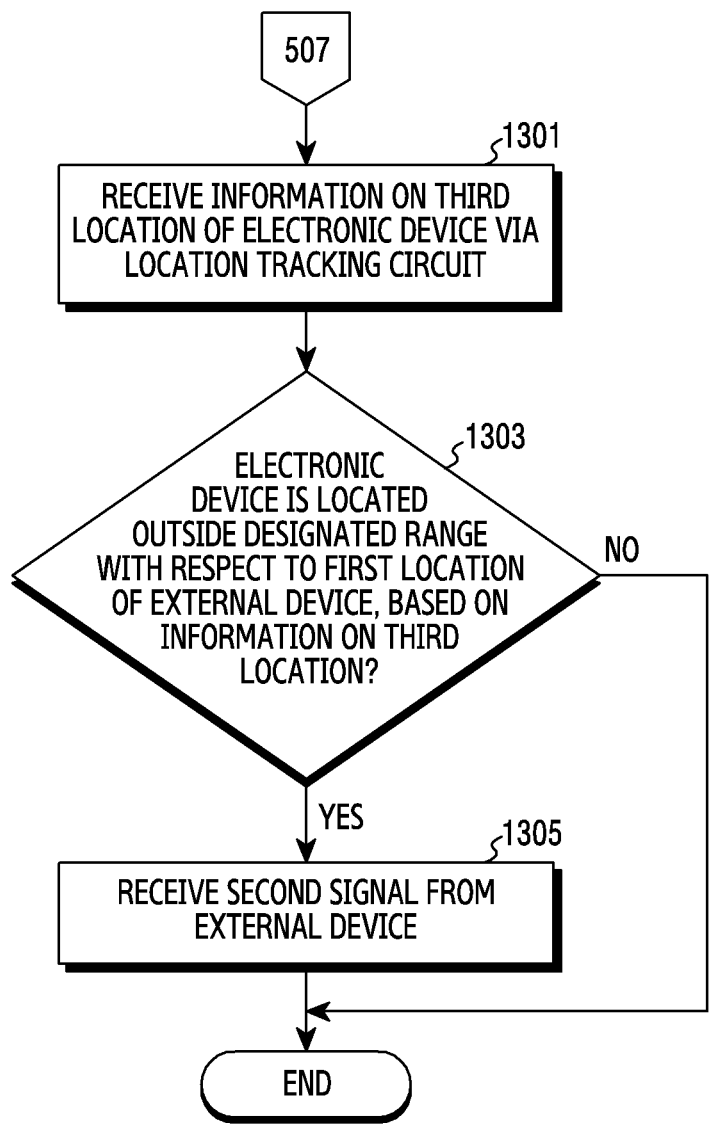
FIG. 13 is a flowchart for illustrating an operation in which the wireless communication chipset receives a signal from the external device if the electronic device located within a designated range moves out of the designated range, according to an embodiment.

FIG. 13 is a flowchart for illustrating an operation in which the wireless communication chipset receives a signal from the external device if the electronic device located within a designated range moves out of the designated range, according to an embodiment.

Referring to FIG. 13, the wireless communication chipset 220 according to an embodiment may receive information on a third location of the electronic device 101 via the location tracking circuit 230 in operation 1301.

According to an embodiment, in operation 1303, the wireless communication chipset 220 may determine whether the electronic device 101 is located outside a designated range with respect to a first location of the external device

401, based on information on the third location. In an embodiment, the designated range may refer to a geo-fence of the external device 401.

According to an embodiment, when the electronic device 101 is located outside the designated range, the wireless communication chipset 220 may receive a second signal (e.g., an advertising signal) from the external device 401 in operation 1305. In an embodiment, from the first time point at which the wireless communication chipset 220 has processed the first signal received from the external device 401 in operation 507, to a second time point at which the wireless communication chipset 220 receives a second signal from the external device 401 in operation 1305, the wireless communication chipset 220 may not receive an additional signal (e.g., an advertising signal) from the external device 401. As the wireless communication chipset 220 does not receive a signal from the external device 401 from the first time point to the second time point, the electronic device 101 may reduce power consumption.

Figure 14:
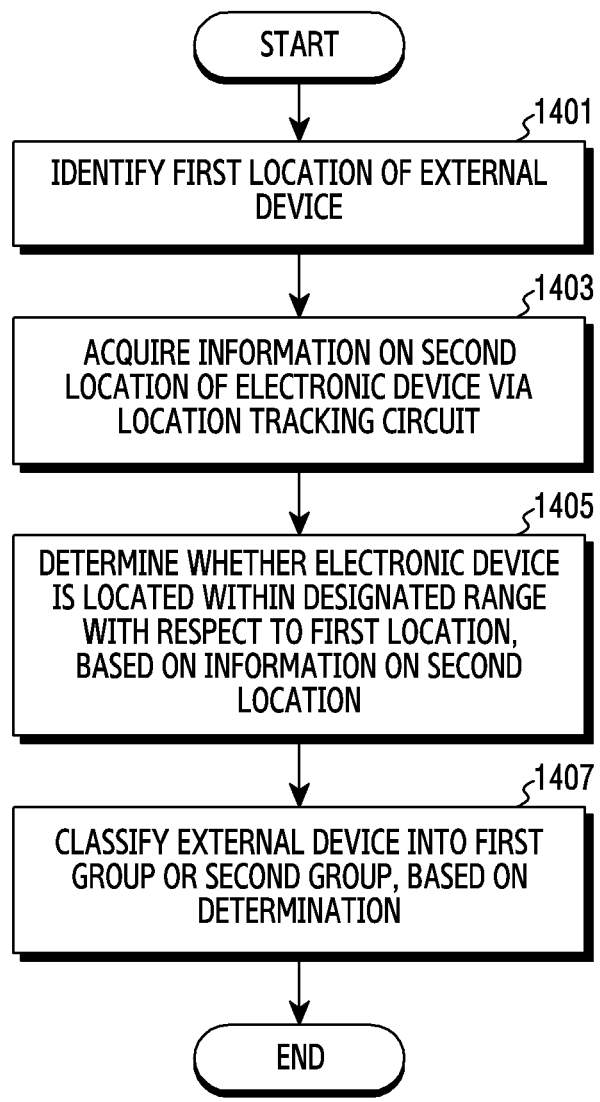
FIG. 14 is a diagram illustrating an operation in which the wireless communication chipset classifies a group of the external device, based on whether the electronic device is located within a designated range, according to an embodiment.

FIG. 14 is a diagram illustrating an operation in which the wireless communication chipset classifies a group of the external device, based on whether the electronic device is located within a designated range, according to an embodiment.

Referring to FIG. 14, the wireless communication chipset 220 according to an embodiment may identify a first location of the external device 401 in operation 1401.

According to an embodiment, the wireless communication chipset 220 may acquire information on a second location of the electronic device 101 via the location tracking circuit 230 in operation 1403.

According to an embodiment, in operation 1405, the wireless communication chipset 220 may determine, based on information on the second location, whether the electronic device 101 is located within a range (e.g., a first range) designated based on the first location. In an embodiment, the designated range may refer to a geo-fence of the external device 401.

According to an embodiment, the wireless communication chipset 220 may classify, based on the determination, the external device 401 into a first group or a second group in operation 1407. In an embodiment, the classification of the external device 401 into the first group may indicate that the wireless communication chipset 220 is configured to process a signal received from the external device 401 while the application processor 210 is in the low power state. The classification of the external device 401 into the second group may indicate that the application processor 210 released from the low power state is configured to process a signal received from the external device 401. In an embodiment, the wireless communication chipset 220 may store, in a memory (e.g., the memory 130 of FIG. 1), first information on first external devices identified to be in the first group and/or second information on second external devices identified to be in the second group. In an embodiment, the term "group" is used to distinguish between external devices communicatively connected to the electronic device 101. However, the disclosure is not limited thereto, and various terms other than "group" may be used to distinguish external devices. For example, the wireless communication chipset 220 may classify external devices into a first list or a second list.

The electronic device 101 according to various embodiments disclosed in the document may include the application processor 210, and the wireless communication chipset 220 electrically connected to the application processor 210 and configured to support short-range communication, wherein the wireless communication chipset 220 is configured to, while the application processor 210 is in a low power state, identify a first location of the first external device 401, acquire information on a second location of the electronic device 101 via the location tracking circuit 230, and determine, based on the information on the second location, whether the electronic device 101 is located within a first range with respect to the first location, the wireless communication chipset 220 is configured to process a first signal received from the first external device 401 if the electronic device 101 is located within the first range, and the application processor 210 is configured to process the first signal received from the first external device 401 if the electronic device 101 is located outside the first range.

According to an embodiment, the wireless communication chipset 220 may identify that the first external device 401 belongs to a first group if the electronic device 101 is located within the first range, and may identify that the first external device 401 belongs to a second group if the electronic device 101 is located outside the first range.

According to an embodiment, the wireless communication chipset 220 may process the first signal received from the first external device 401, and then may switch the first external device identified as the first group to the second group.

The electronic device 101 according to an embodiment may further include the memory 130 electrically connected to the wireless communication chipset 220, wherein the memory 130 stores first information on first external devices included in the first group and second information on second external devices included in the second group.

The electronic device 101 according to an embodiment may further include the display 250 electrically connected to the application processor 210, wherein the application processor 210 releases the low power state in response to a first user input on the display 250, displays an object of an application associated with the short-range communication on the display 250, and display, on the display 250, a user interface configured to control the first external device, in response to a second user input for the object of the application.

According to an embodiment, the object may include an icon, a label, and/or a name indicating the application.

The electronic device 101 according to an embodiment may further include at least one sensor, wherein the application processor 210 electrically connected to the at least one sensor releases the low power state in response to occurrence of a designated event, identifies movement of the electronic device via the at least one sensor, and receives a second signal from the first external device 401 via the wireless communication chipset 220.

According to an embodiment, the wireless communication chipset 220 may receive information on a third location of the electronic device 101, may determine, based on the information on the third location, whether the electronic device 101 is located outside the first range with respect to the first location of the first external device, and may receive a second signal from the first external device 401 if the electronic device 101 is located outside the first range with respect to the first location.

The electronic device 101 according to an embodiment may further include the memory 130 including information on the first location of the first external device 401, wherein the wireless communication chipset 220 acquires the information on the first location of the first external device 401 from the memory 130.

According to an embodiment, the wireless communication chipset 220 may receive, from the first external device 401, information on a relative distance of the first external device 401 to the electronic device 101.

According to an embodiment, the wireless communication chipset 220 may include the wireless communication circuit 222 configured to establish a communication connection to the first external device 401 so as to receive the first signal, and the sub-processor 221 configured to process the first signal.

The electronic device 101 according to an embodiment may further include the location tracking circuit 230, wherein the wireless communication chipset 220 identifies the second location of the electronic device 101 by using the location tracking circuit 230.

According to an embodiment, the wireless communication chipset 220 may identify a third location of a second external device, may determine, based on the third location, whether the electronic device 101 is located within a second range, may identify a first distance between the electronic device 101 and the first external device 401 and a second distance between the electronic device and the second external device if the electronic device 101 is located within the first range with respect to the first location of the first external device 401, and the electronic device 101 is located within the second range with respect to the third location of the second external device, and may classify the first external device and the second external device into distinct groups by comparing the first distance with the second distance.

According to an embodiment, if the first distance is greater than the second distance, the wireless communication chipset 220 may identify the first external device as a first group and may identify the second external device as a second group.

An operation method of the electronic device 101 including the application processor 210 and the wireless communication chipset 220 according to various embodiments disclosed in the document may include, while the application processor 210 is in a low power state, identifying a first location of the external device 401, acquiring information on a second location of the electronic device 101, determining, based on the information on the second location, whether the electronic device 101 is located within a designated range with respect to the first location, and classifying, based on the determination, the external device 401 into a first group or a second group, wherein the wireless communication chipset 220 processes a first signal received from the external device 401 if the external device 401 is classified into the first group, and the application processor 210 processes the first signal received from the external device 401 if the external device 401 is classified into the second group.

The operation method of the electronic device 101 according to an embodiment may further include classifying the external device into the first group if the electronic device 101 is located within the designated range with respect to the first location of the external device, or classifying the external device into the second group if the electronic device is located outside the designated range with respect to the first location of the external device.

The operation method of the electronic device 101 according to an embodiment may further include releasing the low power state of the application processor in response to a first user input on the display 250, displaying an object of an application associated with short-range communication on the display 250, and displaying, on the display, a user interface configured to control the external device, in response to a second user input for the object of the application.

The operation method of the electronic device 101 according to an embodiment may further include, when the wireless communication chipset 220 processes the first signal received from the external device classified into the first group, switching the external device to the second group.

The operation method of the electronic device 101 according to an embodiment may further include receiving, from the external device, information on a relative distance of the external device to the electronic device.

The operation method of the electronic device 101 according to an embodiment may further include acquiring the information on the first location of the external device from the memory 130 of the electronic device 101.

What is claimed is:

1. An electronic device comprising:
    an application processor; and
    a wireless communication chipset electrically connected to the application processor and configured to support short-range communication,
    wherein the wireless communication chipset is configured to, while the application processor is in a low power state:
        identify a first location of a first external device,
        acquire information on a second location of the electronic device, and
        based on the information on the second location, determine whether the electronic device is located within a first range with respect to the first location, and
    wherein the wireless communication chipset is configured to process a first signal received from the first external device based on a determination that the electronic device is located within the first range, and the application processor is configured to process the first signal received from the first external device based on a determination that the electronic device is located outside the first range.

2. The electronic device of claim 1, wherein the wireless communication chipset is configured to:
    identify the first external device as belonging to a first group based on a determination that the electronic device is located within the first range, and
    identify the first external device as belonging to a second group based on a determination that the electronic device is located outside the first range.

3. The electronic device of claim 2, wherein the wireless communication chipset is configured to switch the first external device identified as the first group to the second group based on completion of processing the first signal received from the first external device.

4. The electronic device of claim 2, further comprising a memory electrically connected to the wireless communication chipset,
    wherein the memory is configured to store first information on first external devices included in the first group and second information on second external devices included in the second group.

5. The electronic device of claim 1, further comprising a display electrically connected to the application processor,
    wherein the application processor is configured to:
    release the low power state in response to a first user input on the display,
    display an object of an application associated with the short-range communication on the display, and display a user interface configured to control the first external device, in response to a second user input for the object of the application.

6. The electronic device of claim 5, wherein the object comprises an icon, a label, and/or a name indicating the application.

7. The electronic device of claim 1, further comprising at least one sensor, wherein the application processor electrically connected to the at least one sensor is configured to:
release the low power state in response to occurrence of a designated event,
identify movement of the electronic device via the at least one sensor, and
receive a second signal from the first external device via the wireless communication chipset.

8. The electronic device of claim 1, wherein the wireless communication chipset is configured to:
receive information on a third location of the electronic device,
based on the information on the third location, determine whether the electronic device is located outside the first range with respect to the first location of the first external device, and
receive a second signal from the first external device based on a determination that the electronic device is located outside the first range with respect to the first location.

9. The electronic device of claim 1, further comprising a memory comprising information on the first location of the first external device,
wherein the wireless communication chipset is configured to acquire the information on the first location of the first external device from the memory.

10. The electronic device of claim 1, wherein the wireless communication chipset is configured to receive, from the first external device, information on a relative distance of the first external device to the electronic device.

11. The electronic device of claim 1, wherein the wireless communication chipset comprises:
a wireless communication circuit configured to establish a communication connection to the first external device so as to receive the first signal, and
a sub-processor configured to process the first signal.

12. The electronic device of claim 1, further comprising a location tracking circuit,
wherein the wireless communication chipset is configured to identify the location of the electronic device by using the location tracking circuit.

13. The electronic device of claim 1, wherein the wireless communication chipset is configured to:
identify a third location of a second external device,
based on the third location, determine whether the electronic device is located within a second range with respect to the third location of the second external device,
identify a first distance between the electronic device and the first external device and a second distance between the electronic device and the second external device based on a determination that the electronic device is located within the first range with respect to the first location of the first external device, and the electronic device is located within the second range with respect to the third location of the second external device, and
classify the first external device and the second external device into distinct groups by comparing the first distance with the second distance.

14. The electronic device of claim 13, wherein the wireless communication chipset is configured to:
based on a determination that the first distance is greater than the second distance, identify the first external device as belonging to a first group and identify the second external device as belonging to a second group.

15. An operation method of an electronic device comprising an application processor and a wireless communication chipset, the operation method comprising, while the application processor is in a low power state:
identifying a first location of an external device;
acquiring information on a second location of the electronic device;
based on the information on the second location, determining whether the electronic device is located within a designated range with respect to the first location; and
based on the determination, classifying the external device into one of a first group and a second group,
wherein the wireless communication chipset is configured to process a first signal received from the external device based on a determination that the external device is classified into the first group, and the application processor is configured to process the first signal received from the external device based on a determination that the external device is classified into the second group.

16. The operation method of claim 15, further comprising classifying the external device into the first group based on a determination that the electronic device is located within the designated range with respect to the first location of the external device, and classifying the external device into the second group based on a determination that the electronic device is located outside the designated range with respect to the first location of the external device.

17. The operation method of claim 15, further comprising:
releasing the low power state of the application processor in response to a first user input on the display;
displaying an object of an application associated with short-range communication on the display; and
displaying a user interface configured to control the external device, in response to a second user input for the object of the application.

18. The operation method of claim 15, further comprising, based on the wireless communication chipset processing the first signal received from the external device classified into the first group, switching the external device to the second group.

19. The operation method of claim 15, further comprising receiving, from the external device, information on a relative distance of the external device to the electronic device.

20. The operation method of claim 15, further comprising acquiring the information on the first location of the external device from a memory of the electronic device.

* * * * *